(12) United States Patent
Nakamura

(10) Patent No.: US 9,382,819 B2
(45) Date of Patent: Jul. 5, 2016

(54) VARIABLE VALVE DEVICE FOR INTERNAL COMBUSTION ENGINE

(71) Applicant: HITACHI AUTOMOTIVE SYSTEMS, LTD., Ibaraki (JP)

(72) Inventor: Makoto Nakamura, Zushi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/427,114

(22) PCT Filed: Sep. 3, 2013

(86) PCT No.: PCT/JP2013/073614
§ 371 (c)(1),
(2) Date: Mar. 10, 2015

(87) PCT Pub. No.: WO2014/073259
PCT Pub. Date: May 15, 2014

(65) Prior Publication Data
US 2015/0240671 A1    Aug. 27, 2015

(30) Foreign Application Priority Data
Nov. 7, 2012  (JP) .................................. 2012-244999

(51) Int. Cl.
*F01L 1/34*    (2006.01)
*F01L 1/26*    (2006.01)
(Continued)

(52) U.S. Cl.
CPC . *F01L 1/267* (2013.01); *F01L 1/10* (2013.01); *F01L 1/255* (2013.01); *F01L 1/462* (2013.01);
(Continued)

(58) Field of Classification Search
CPC ........... F01L 1/10; F01L 1/255; F01L 11/267; F01L 13/005; F01L 13/026; F01L 13/0063

USPC ................................. 123/90.16, 90.39, 90.44
See application file for complete search history.

(56) References Cited

U.S. PATENT DOCUMENTS 7,712,443 B2    5/2010  Gemein
8,001,936 B2 *  8/2011  Nakamura ............. F01L 1/267
                                              123/346

FOREIGN PATENT DOCUMENTS

| JP | S63-016112  | 1/1988  |
| JP | 2004-316571 | 11/2004 |

(Continued)

OTHER PUBLICATIONS

International Search Report dated Dec. 10, 2013 issued in PCT/JP2013/073614.

*Primary Examiner* — Ching Chang
(74) *Attorney, Agent, or Firm* — Foley & Lardner LLP

(57) ABSTRACT

Provided is a variable valve device for an internal combustion engine. The variable valve device includes intake- and exhaust-side swing arms that pivot to open and close intake valves and exhaust valves in two cylinders #1, #2, intake- and exhaust-side hydraulic lash adjusters that serve as pivot points of the respective swing arms, a variable valve system that continuously varies valve lift characteristics of the intake valves and lost motion mechanisms that stop opening and closing of the intake exhaust valves by lost motion of the intake- and exhaust-side hydraulic lash adjusters on the cylinder #1. The maximum valve lifts of the intake valves are set larger than valve lifts of the exhaust valves. The minimum valve lifts of the intake valves are set smaller than the valve lifts of the exhaust valves.

20 Claims, 18 Drawing Sheets

(51) Int. Cl.
  *F02D 13/02* (2006.01)
  *F01L 1/10* (2006.01)
  *F01L 13/00* (2006.01)
  *F01L 1/46* (2006.01)
  *F01L 1/255* (2006.01)
  *F01L 1/24* (2006.01)

(52) U.S. Cl.
  CPC ............ *F01L 13/00* (2013.01); *F01L 13/0005* (2013.01); *F01L 13/0026* (2013.01); *F01L 13/0063* (2013.01); *F02D 13/0211* (2013.01); *F02D 13/0246* (2013.01); *F01L 2001/2433* (2013.01); *Y02T 10/18* (2013.01)

(56) References Cited

FOREIGN PATENT DOCUMENTS

| | | |
|---|---|---|
| JP | 2006-052737 | 2/2006 |
| JP | 2007-100585 | 4/2007 |
| JP | 2009-503345 | 1/2009 |
| JP | 2009-209879 | 9/2009 |
| JP | 2010-127074 | 6/2010 |
| JP | 2010-270633 | 12/2010 |

* cited by examiner

VARIABLE VALVE DEVICE FOR INTERNAL COMBUSTION ENGINE

FIELD OF THE INVENTION

The present invention relates to a variable valve device for an internal combustion engine, which is capable of stopping the opening and closing of intake and exhaust engine valves according to an engine operation state.

BACKGROUND ART

There is conventionally known a variable valve device for an internal combustion engine as disclosed in Patent Document 1.

This variable valve device includes a valve stop (deactivation) mechanism capable of stopping (deactivating) the opening and closing of intake and exhaust valves in a part of cylinders of the internal combustion engine. In a high-rotation operation state where engine output is required, bodies of lash adjusters, which serve as pivot points of rocker arms, are fixed by switching members to a cylinder head of the internal combustion engine such that the lash adjusters perform a normal lash adjustment function. When the lash adjusters push down the rocker arms via cams, the rocker arms pivot about their respective one ends. Then, the intake and exhaust valves are driven to be opened and closed at respective given valve lifts by the other ends of the rocker arms.

In a normal operation state where fuel efficiency is required, by contrast, the switching members are moved into the bodies of the lash adjusters so as to stop the opening and closing of the intake and exhaust valves in the part of the cylinders by lost motion of the lash adjusters and thereby allow so-called cylinder cut-off operation during which combustion takes place in the remaining cylinders for improvement of fuel efficiency.

PRIOR ART DOCUMENTS

Patent Document

Patent Document 1: Japanese Laid-Open Patent Publication No. 2007-100585 (FIG. 3)

SUMMARY OF THE INVENTION

Problem to be Solved by the Invention

In the above conventional variable valve device, the amount of lost motion caused at the valve stop inevitably becomes greater with increase in the amount of valve lift by the cam. As the open angle between the longitudinal direction of the lash adjuster and the rocker arm increases with such increase in lost motion amount, there arises a possibility that it may not be possible to perform smooth lost motion operation due to the occurrence of, even not disengagement, but slight floating (non-contact) of the one end of the rocker arm from the abutting part of the lash adjuster. For this reason, the valve opening lifts of the intake and exhaust valves cannot be increased sufficiently.

On the other hand, the requirement for the magnitude relation between the valve opening lifts of the intake and exhaust valves differs depending on the type of the internal combustion engine. In the case where the internal combustion engine is a natural aspiration type gasoline engine, the valve opening lift of the intake valve needs to be set larger than the valve opening lift of the exhaust valve. It is because that, in order to increase engine output in the high-rotation operation state, it is important to secure intake air amount (filling efficiency) and necessary to increase the valve opening lift of the intake valve. In the natural aspiration type gasoline internal combustion engine, the exhaust pressure loss is low so that there is less influence on engine output even when the valve opening lift of the exhaust valve is not so large.

In such a case, the lost motion amount becomes greater on the intake valve side where the required valve opening lift is large than on the exhaust valve side where the required valve opening lift is relatively small. However, there arises a possibility of unsmooth lost motion operation with increase in lost motion amount as mentioned above. The valve opening lift of the intake valve has to be limited, which results in deterioration of engine output.

The present invention has been made in view of the foregoing technical problems. It is an object of the present invention to provide a variable valve device for an internal combustion engine, capable of improving engine characteristics by e.g. increasing the maximum valve lift of an intake valve while preventing excessive lost motion operation of lost motion mechanisms.

Means for Solving the Problems

According to the present invention, there is provided a variable valve device for an internal combustion engine, comprising: intake and exhaust valves biased in respective valve close directions by spring forces of valve springs; a pair of intake- and exhaust-side swing arms that pivot to open and close the intake and exhaust valves, respectively; a pair of pivot members that serve as pivot points of the swing arms; a variable valve system that continuously varies a valve lift characteristic of the intake valve; a valve drive system that causes the swing arm to drive the exhaust valve at a constant valve lift; and lost motion mechanisms that stop opening and closing of the intake and exhaust valves by lost motion of the pivot members, wherein a maximum valve lift of the intake valve is set larger than the valve lift of the exhaust valve; and wherein a minimum valve lift of the intake valve is set smaller than the valve lift of the exhaust valve.

Effects of the Invention

It is possible according to the present invention to improve various engine characteristics such as engine output by e.g. increasing the maximum valve lift of the intake valve while preventing excessive lost motion operation of the lost motion mechanisms.

It is also possible according to the present invention to improve various engine characteristics such as fuel efficiency by decreasing the minimum valve lift of the intake valve.

DESCRIPTION OF EMBODIMENTS

Hereinafter, a variable valve device for an internal combustion engine according to one embodiment of the present invention will be described below in detail with reference to the drawings. In the present embodiment, the internal combustion engine is configured as a two-cylinder gasoline engine having a front-side cylinder #1 as a deactivatable cylinder in which the operations of intake and exhaust valves can be stopped and a rear-side cylinder #2 as a normally activated cylinder in which intake and exhaust valves are operated at all times without cylinder deactivation.

Figure 1:
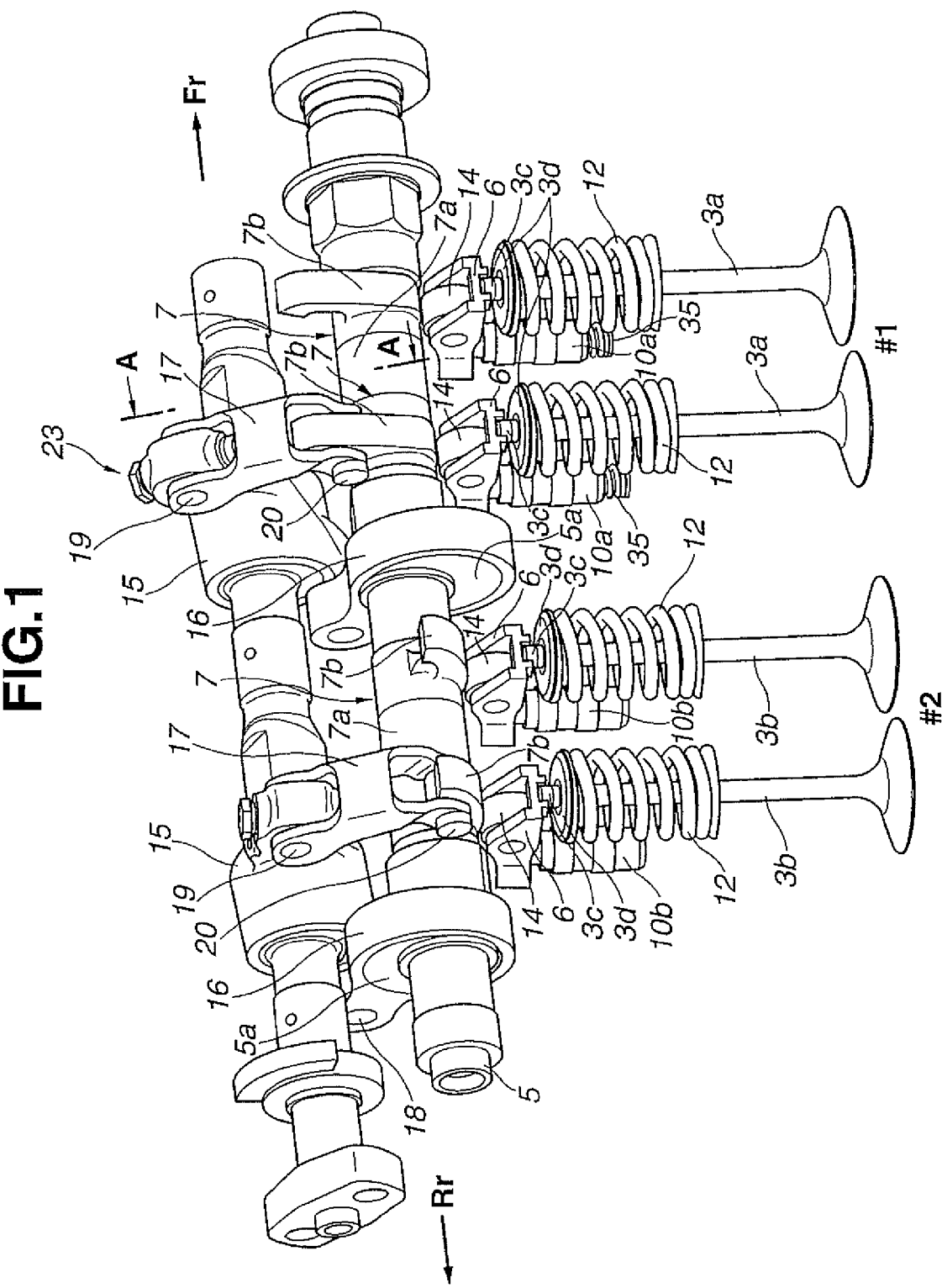
FIG. 1 is a two-cylinder internal combustion engine with a variable valve device according to one embodiment of the present invention.
Figure 2:
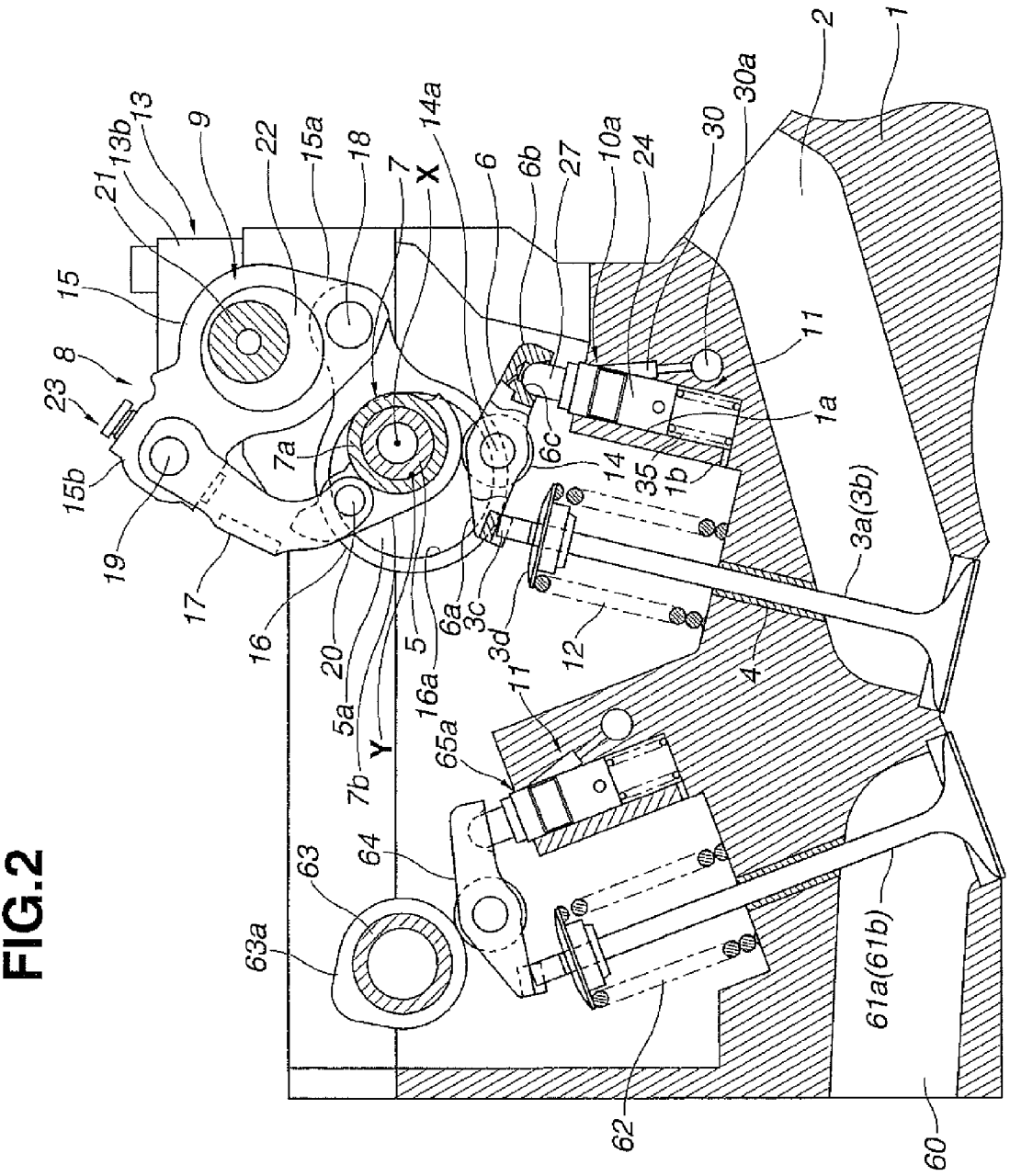
FIG. 2 is a section view taken alone line A-A of FIG. 1.

FIG. 1 shows an intake valve drive apparatus on the cylinder #1, #2. FIG. 2 shows not only the intake valve drive apparatus with a variable valve system but also an exhaust valve drive apparatus on the cylinder #1 (deactivatable cylinder).

First, the intake valve drive apparatus on the cylinder #1, #2 will be explained below. As shown in FIGS. 1 and 2, the internal combustion engine has two intake valves per cylinder arranged to open and close a pair of intake ports 2, 2 of a cylinder head 1. More specifically, the first and second intake valves 3a, 3b are arranged in the cylinder #1; and the first and second intake valves 3b, 3b are arranged in the cylinder #1. It is noted that the first intake valve is located on the front side of the cylinder; and the second intake valve is located on the rear side of the cylinder.

In the intake valve drive apparatus, the variable valve system includes a drive shaft 5 arranged over the respective cylinders in a front-rear direction of the internal combustion engine and having two drive cams 5a mounted on an outer circumferential surface thereof, a pair of swing cams 7 rotatably supported on the outer circumferential surface of the drive shaft 5 and each having cam surfaces 7b, 7b for opening and closing the intake valves 3 by pivotal movement of swing arms 6 as interposing members, a transmission mechanism 8 that converts rotation of the drive cams 5 to pivotal force and transmit the pivotal force to the swing cams 7 and a control mechanism 9 that controls the valve operating angles and valve lifts of the intake valves 3a, 3a, 3b, 3b through the transmission mechanism 8.

Further, the intake valve drive apparatus has hydraulic lash adjusters supported as pivot members (pivots) on the cylinder head 1 so as to adjust the clearances between the swing arms 6 and the intake valves 3a, 3a, 3b, 3b and between the swing arms 6 and base circle regions of the cam surfaces 7b of the swing cams 7 to zero lash.

In the present embodiment, four first to fourth hydraulic lash adjusters 10a, 10a, 10b, 10b are arranged on the intake valve side. More specifically, the first and second hydraulic lash adjusters 10a, 10a are arranged on the cylinder #1; and the third and fourth hydraulic lash adjusters 10b, 10b are arranged on the cylinder #2.

It is noted that: the first hydraulic lash adjuster 10a is located on the front side of the cylinder #1; the second hydraulic lash adjuster 10a is located on the rear side of the cylinder #1; the third hydraulic lash adjuster 10b is located on the front side of the cylinder #2; and the fourth hydraulic lash adjuster 10b is located on the rear side of the cylinder #2.

The intake valve drive apparatus also has two lost motion mechanisms 11 that stop the opening and closing operations of the first and second intake valves 3a, 3a in the cylinder #1 through the first and second hydraulic lash adjusters 10a, 10a.

The intake-valve-side variable valve system, which is constituted by the drive shaft 5, the swing cams 7, the transmission mechanism 8 and the control mechanism 7 as mentioned above, is hereinafter referred to as "intake VEL system".

Although not specifically shown in the drawings, the intake valve drive apparatus has a vane-type phase-alternation valve timing control (VTC) system disposed on a front end portion of the drive shaft 5 so as to twist the drive shaft 5 and vary the opening and closing timings of the intake valves 3a, 3b according to the engine operation state.

The respective structural components on the cylinder #1, #2 will be next explained below.

Each of the intake valves 3a, 3b is slidably mounted to the cylinder head 1 via a valve guide 4. Spring retainers 3d are provided on the vicinities of stem ends 3c of the intake valves 3a, 3b. Valve springs 12 are elastically held between the spring retainers 3d and the upper inner surface of the cylinder head 1 such that the intake valves 3a, 3b are biased in respective valve close directions by the valve springs 12.

A plurality of bearing parts 13 are formed on an upper end portion of the cylinder head 1. The drive shaft 5 is rotatably supported on these bearing parts 13 via cam shafts 7a of the swing cams 7. A timing pulley is fixed to a housing of the intake VTC system, which is disposed on the end portion of the drive shaft 5 as mentioned above, such that rotation of a crankshaft is transmitted to the drive shaft 5 via the timing pulley. Each of the drive cams 5a is formed per cylinder on the outer circumferential surface of the drive shaft 5 and has a substantially normal circular outer cam profile with a center Y thereof radially displaced from an axis X of the drive shaft 5.

Each of the swing arms 6 has one end portion 6a held at a flat or slightly convex lower surface thereof in contact with the stem end 3c of the intake valve 3a, 3a, 3b, 3b and the other end portion 6b held at a concave lower surface part thereof in contact with a top end of the hydraulic lash adjuster 10a, 10a, 10b, 10b. Accommodation holes are formed in the centers of the swing arms 6. Rollers 14 are rotatably fitted in these accommodation holes via roller shafts 14a.

As shown in FIGS. 1 and 2, the cam surfaces 7b are formed on both end portions of the cylindrical cam shaft 7a of the swing cam 7. The base circle region, ramp region or lift region of the cam surfaces 7b come into rolling contact with upper surfaces of the rollers 14 of the swing arms 6 depending on the pivot position of the swing cams 7.

Each of the can shafts 7a has a journal portion formed at a substantially axially middle position on an outer circumferential surface thereof and rotatably supported on the bearing part 13 with a slight clearance left therebetween.

The transmission mechanism 8 includes rocker arms 15 arranged over the drive shaft 5, link arms 16 connecting one end portions of the rocker arms 15 to the drive cams 5a and link rods 17 connecting the other end portions 15b of the rocker arms 15 to the swing cams 7.

Each of the rocker arms 15 has a cylindrical base portion formed in the center thereof and rotatably supported on the after-mentioned control cam through retaining holes. The one end portions 15a of the rocker arms 15 are rotatably coupled to the link arms 16 by pins 18. The other end portions 15b of the rocker arms 15 are rotatably coupled to upper end portions of the link rods 17 by pins 19.

Each of the link arms 16 has an annular base portion and a protruding end portion. Mounting holes 16a are formed in the centers of the base portions of the link arms 16. The cam bodies of the drive cams 5a are roratably fitted in these mounting holes 16a. The protruding end portions of the link arms 16 are coupled to the one end portions 15a of the rocker arms 16 by the pins 18.

The link rods 17 are rotatably coupled at lower end portions thereof by pins 20 to the cam nose portions of the swing cams 7 on each of which one of the cam surfaces 7b is formed.

Furthermore, adjustment mechanisms 23 are disposed in respective spaces between the other end portions 15b of the rocker arms 15 and the upper end portions of the link rods 17 so as to allow fine adjustment of the valve lifts of the intake valves 3a, 3b during assembling of the structural components.

The control mechanism 9 includes a control shaft 21 arranged over the respective cylinders and rotatably supported on the same bearing parts as above and two control cams 22 mounted on an outer circumferential surface of the control shaft 21 and slidably engaged in the retaining holes of the rocker arms 15 as pivot points of the rocker arms 15.

Figure 5:
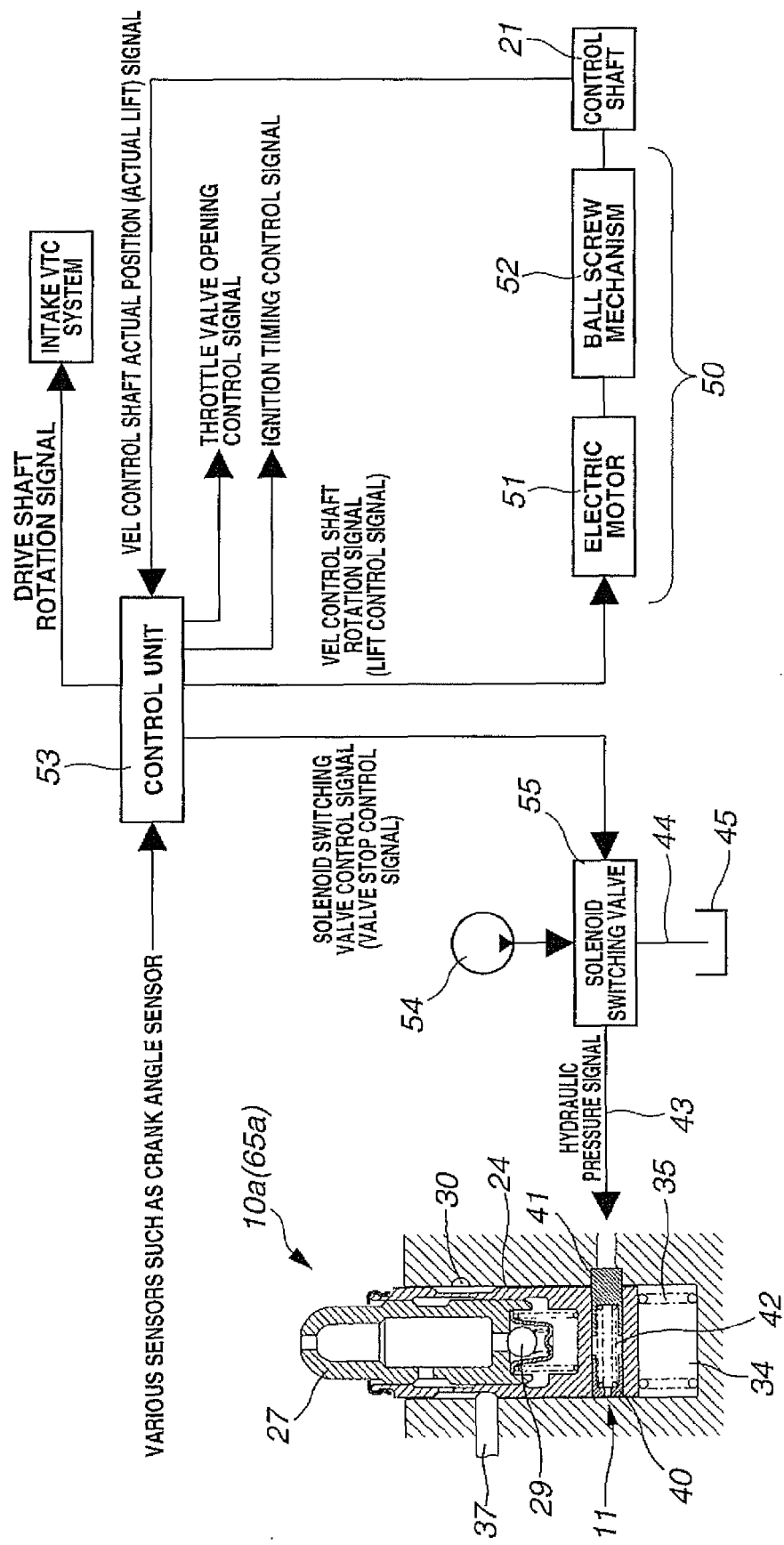
FIG. 5 is a schematic view of a hydraulic control circuit of the variable valve device according to the one embodiment of the present invention.

The control shaft 21 extends in parallel with the drive shaft 5 in the front-rear direction of the internal combustion engine. The rotation of the control shaft 21 is controlled by an actuator 50 as shown in FIG. 5. Each of the control cams 22 has a cylindrical shape with a center thereof displaced by a given amount from an axis of the control shaft 21.

As shown in FIG. 5, the actuator 50 includes an electric motor 51 fixed to one end portion of the not-shown housing and a ball screw mechanism 52 disposed in the housing and equipped with a ball screw element and a conversion link as a reduction gear to transmit rotational driving power of the electric motor 51 to the control shaft 21.

The electric motor 51 is in the form of a proportion type DC motor. The electric motor 51 is driven in a normal rotation or reverse rotation direction under a control signal from a control unit 53 with detection of the engine operation state.

As shown in FIGS. 1 to 4, each of the first to fourth hydraulic lash adjustors 10a 10b includes a bottomed cylindrical body 24 retained in a cylindrical retaining hole 1a of the cylinder head 1, a plunger 27 vertically slidably disposed in the body 24 and having a partition wall 25 integrally formed on a bottom part thereof, a reservoir room 26 defined in the plunger 27 by the partition wall 5, a high-pressure room 28 defined in a bottom part of the body 24 in communication with the reservoir room 26 through a communication hole 25a of the partition wall 25 and a check valve 29 arranged in the high-pressure room 28 to permit a flow of hydraulic oil from the reservoir room 26 only into the high-pressure room 28. Discharge holes 1b are formed in the cylinder head 1 to discharge therethrough the hydraulic oil from the retaining holes 1a to the outside.

A cylindrical first recess groove 24a is formed in an outer circumferential surface of the body 24. An oil passage 30 is formed in the cylinder head 1 such that a downstream end of the oil passage 30 is open to the first recess groove 24a. A first communication hole 31 is radially formed through a circumferential wall of the first recess groove 24a for communication between the oil passage 30 and the inside of the body 24.

As shown in FIGS. 3A and 3B, bottom end portions of the bodies 24 of the first and second hydraulic lash adjusters 10a, 10a on the cylinder #1 are substantially cylindrical column-shaped and extend to a lower position than those of the bodies 24 of the third and fourth hydraulic lash adjusters 10b, 10b on the cylinder #2.

A main oil gallery is formed in the cylinder head 1 for supply of lubricating oil although not shown in the drawings. The oil passage 30 is in communication with the main oil gallery. The lubricating oil is pressurized and supplied to the main oil gallery by an oil pump as shown in FIG. 5.

Figure 3:
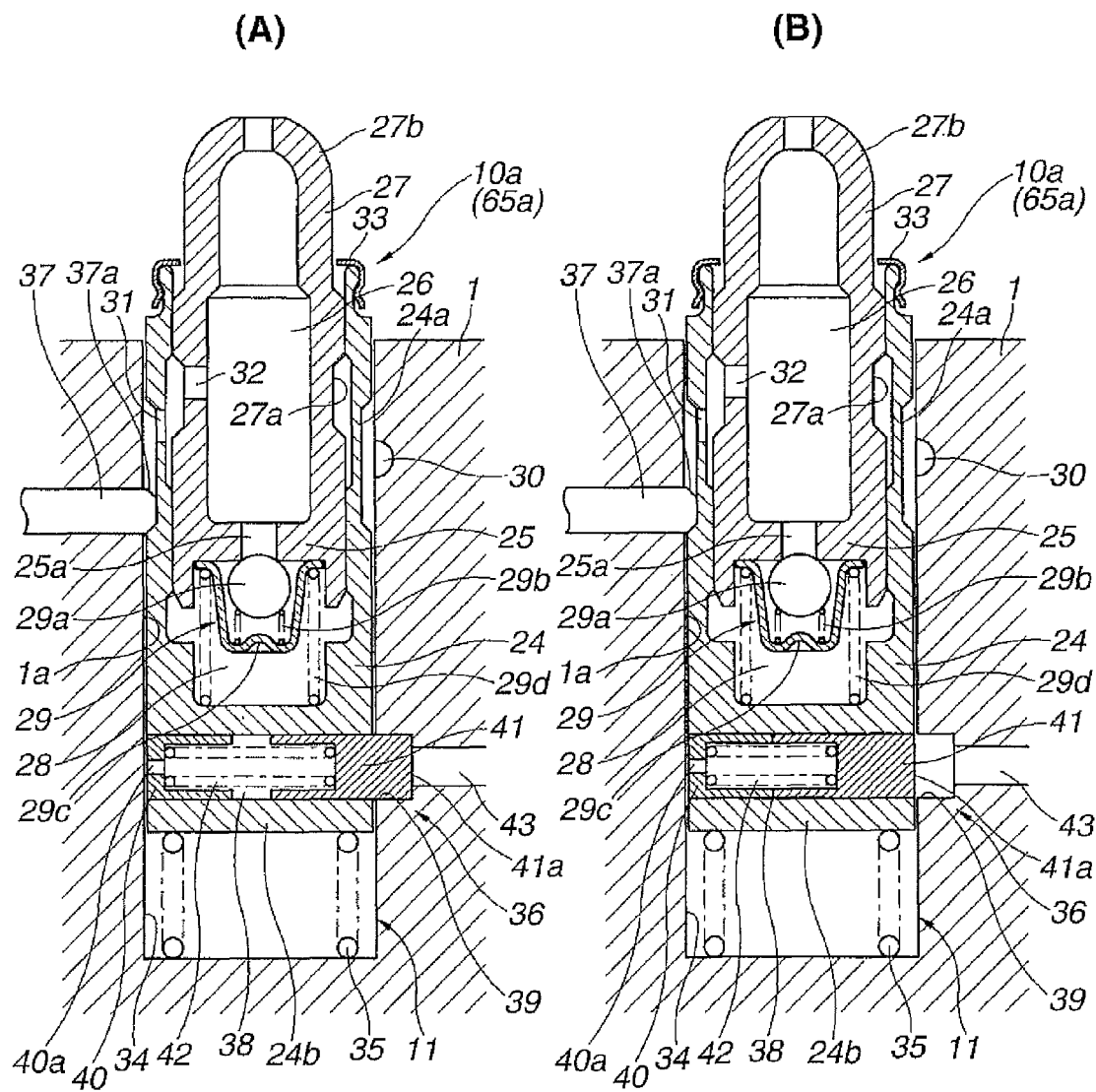
FIGS. 3A and 3B are section views of a first or second hydraulic lash adjuster of the variable valve device according to the one embodiment of the present invention.
Figure 4:
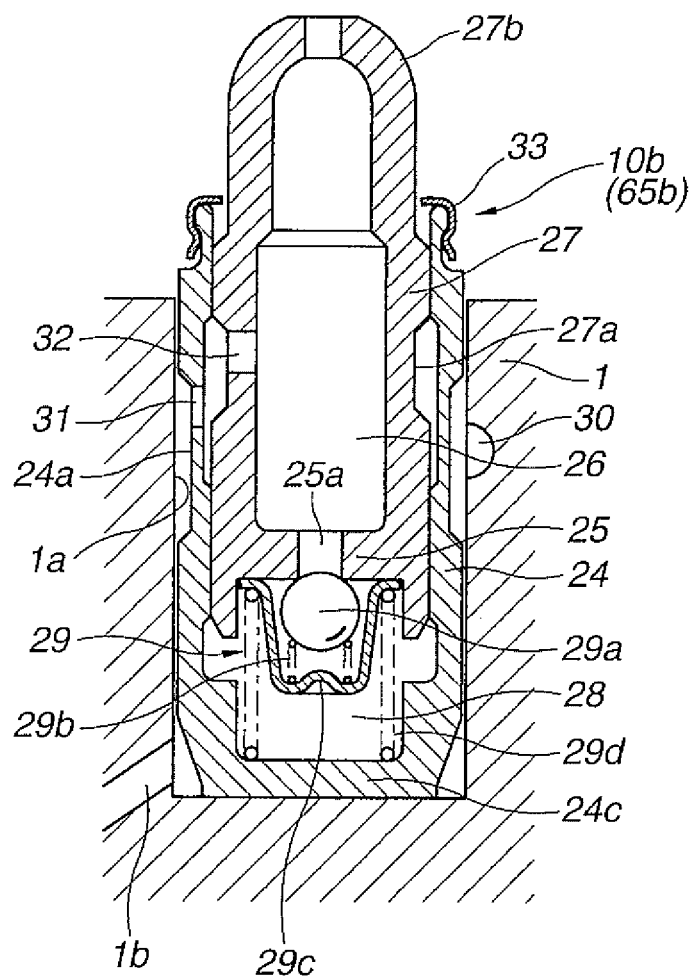
FIG. 4 is a section view of a third or fourth hydraulic lash adjuster of the variable valve device according to the one embodiment of the present invention.

As shown in FIGS. 3 and 4, a cylindrical second recess groove 27a is formed at a substantially axially middle position in an outer circumferential surface of the plunger 27. A second communication hole 32 is radially formed through a circumferential wall of the second recess groove 27a for communication between the first communication hole 31 and the reservoir room 26. A top end portion 27b of the plunger 27 is formed with a spherical end surface for good sliding contact with the spherical concave part 6c of the lower surface of the other end portion 6b of the swing arm 6

An annular stopper member 33 is fitted around a top end portion of the body 24 so as to control the maximum protrusion amount of the plunger 27.

In each hydraulic lash adjuster, an axial width of the second recess groove 27a is set relatively large such that the first and second communication holes 31 and 32 are always in communication with each other at any vertical sliding position of the plunger 27 relative to the body 24.

The check valve 29 has a check ball 29a arranged to open and close a bottom opening end of the communication hole 25a, a first coil spring 29b arranged to bias the check ball 29a in a valve close direction, a cup-shaped retainer 29c retaining therein the first oil spring 29b and a second coil spring 29d elastically held between a bottom wall 24c of the body 24 and an annular upper end portion of the retainer 29c to force the retainer 29c toward the partition wall 25 and bias the whole of the check valve 29 vertically upwardly.

In the base circle region of the cam surface 7b of the swing cam 7c, the inside pressure of the high-pressure room 28 becomes lowered by protrusion movement (upward movement) of the plunger 27 under the biasing force of the second coil spring 29d. Then, the hydraulic oil fed from the oil passage 30 to the retaining hole 1a flows in the reservoir room 26 through the first recess groove 24a, the first communication hole 31, the second recess groove 27a and the first communication hole 32. This hydraulic oil moves the check ball 29 against the spring force of the first coil spring 29b, opens the check valve and flows in the high-pressure room 28.

By the flow of the hydraulic oil into the high-pressure room 28, the plunger 27 pushes up the other end portion 6b of the swing arm 6 and adjusts the swing cam 7, the one end portion 6a of the swing arm 6 and the stem end 3a of the intake valve 3 to zero lash through the contact between the roller 14 and the swing cam 7.

On the other hand, the inside pressure of the high-pressure room 28 becomes increased with the application of downward load on the plunger 27 in the lift region of the swing cam 7. Then, the hydraulic oil leaks out from the high-pressure room 28 through a clearance between the plunger 27 and the body 28 and causes slight downward movement (leak down) of the plunger 27.

Back again in the base circle region of the cam surface 7b of the swing cam 7, the plunger 27 adjusts the swing cam 7, the swing arm 6 and the intake valve 3 to zero lash by its protrusion movement (upward movement) under the biasing force of the second coil spring 29d as mentioned above.

All of the first to fourth hydraulic lash adjustors 10a, 10b have such a lash adjustment function.

In the intake valve drive apparatus, the lost motion mechanisms (valve stop mechanisms) 11 are provided to only the first and second hydraulic lash adjusters 10a, 10a on the cylinder #1. As shown in FIGS. 3A and 3B, these lost motion mechanisms 11 include a pair of cylindrical sliding holes 34 formed continuously to bottom ends of the retaining holes 1a, lost motion springs 35, 35 elastically held between bottom walls of the sliding holes 34 and bottom surfaces of the bodies 24 to bias the first and second hydraulic lash adjusters 10a, 10b upwardly and a pair of restriction units 36 that restrict lost motion of the first and second hydraulic lash adjusters 10a, 10a. As no lost motion mechanisms are provided to the third and fourth hydraulic lash adjusters 10b, 10b on the cylinder #2, the third and fourth hydraulic lash adjusters 10b, 10b normally perform a pivot function and a zero lash adjustment function.

In each lost motion mechanism, an inner diameter of the sliding hole 34 is set equal to an inner diameter of the retaining hole 1a such that the body 24 can be slide vertically continuously from the retaining hole 1a into the sliding hole 34.

Each of the lost motion springs 35 is in the form of a coil spring and is arranged to bias the bottom surface of the body 24 upwardly and elastically bring the top end portion 27b of the plunger 27b into contact with the concave part 6c of the lower surface of the other end portion 6b of the swing arm 6.

A stopper pin 37 is inserted in the cylinder head 1 so as to control the uppermost movement position of the body 24. More specifically, the stopper pin 37 is arranged in the cylinder head 1 to extend toward the body 24 in a direction substantially perpendicular to the body 24. A front end portion 37a of the stopper pin 37 is slidably disposed in the first recess groove 24a. With upward movement of the body 24, the front end portion 37a of the stopper pin 37 is brought into contact with a lower end edge of the first recess groove 24a. The uppermost movement position of the body 24 is controlled by contact of the front end portion 37a of the stopper pin 37 with the lower end edge of the first recess groove 24a.

Accordingly, the function of the hydraulic lash adjuster 10a as the pivot point of the swing arm 6 becomes lost when the hydraulic lash adjuster 10a causes lost motion with up and down strokes between the retaining hole 1a and the sliding hole 34 under the spring force of the lost motion spring 35 by pivotal movement of the swing arm 6. By such lost motion, the hydraulic lash adjuster 10a absorbs the lift of the swing cam 7 and stops the opening and closing of the intake valve 3a.

Each of the restriction units 36 has a movement hole 38 formed radially in the bottom end portion 24b of the body 24, a restriction hole 39 formed in the cylinder head 1 in a direction perpendicular to the retaining hole 1a, a retainer 40 fixed in one end portion of the movement hole 38, a restriction pin 41 slidably disposed in the movement hole 38 to slide from the movement hole 38 to the restriction hole 39 and a return spring 42 elastically held between the restriction pin 41 and the retainer 40 to bias the restriction pin 41 toward the restriction hole 39.

The restriction hole 39 is formed such that, when the body 24 is controlled to the uppermost movement position by the stopper pin 37, the restriction hole 39 axially correspond in position to the movement hole 38. An inner diameter of the restriction hole 39 is set substantially equal to an inner diameter of the movement hole 38. An oil passage 43 is formed in the cylinder head 1 such that hydraulic pressure is introduced from the oil passage 43 to one end portion of the restriction hole 39.

It is feasible to easily restrict the rotation direction of the body 24 by slightly increasing the protrusion amount of the stopper pin 37 and engage the front end portion of the stopper pin 37 in an axially longitudinal slit of the first recess groove 24a of the body 24. Alternatively, another separate rotation restriction member may be provided between the cylinder head 1 and the body 24.

The retainer 40 has a capped cylindrical shape. A breathing hole 40a is formed though a bottom of the retainer 40 for smooth sliding of the restriction pin 41. An axial length of the retainer 40 is set such that, when the restriction pin 41 is completely accommodated in the movement hole 38, the retainer 40 can prevent further backward movement of the restriction pin 41 by contact of a rear end of the restriction pin 41 with a front edge of the retainer 40 as shown in FIG. 4B.

The restriction pin 41 has a solid cylindrical column shape. An outer diameter of the restriction pin 41 is set slightly smaller than the inner diameter of the movement hole 38 and the inner diameter of the restriction hole 39 for smooth sliding of the restriction pin 41 in the movement hole 38 and the restriction hole 39. The restriction pin 41 has a pressure receiving surface formed on a front end portion 41a thereof to receive the hydraulic pressure fed from the oil passage 43 to the restriction hole 39 and, upon receipt of the hydraulic pressure, moves back against the spring force of the return spring 42. The restriction of the hydraulic lash adjuster is released when the front end portion 41a of the restriction pin 41 comes out of the restriction hole 39 and slides into the movement hole 38 by backward movement of the restriction pin 41.

As shown in FIG. 5, the variable valve device has a solenoid valve 55 through which the hydraulic pressure from the oil pump 54 is fed as a hydraulic pressure signal to the oil passages 43 (restriction holes 39) of the respective lost motion mechanisms.

The solenoid switching valve 55 has a valve spool mounted in a valve body to switch the hydraulic pressure signal between two ON and OFF levels by the electromagnetic force of a solenoid and the spring force of a coil spring. As in the case of the drive control of the electric motor 51, the operation of the solenoid switching valve 55 is controlled under a control signal from the control unit 53 so as to bring the oil passage 43 into communication with a pump discharge passage or close the pump discharge passage and bring the oil passage 43 with a drain passage 44. By such switching operation, the hydraulic pressure signal is switched between two high and low signal levels.

The control unit 53 detects the engine operation state based on inputs about engine rotation speed and load, throttle valve opening etc. from various sensors such as crank angle sensor, airflow meter, coolant temperature sensor and throttle valve opening sensor. Although not shown in the drawings, there is provided a rotational position sensor to detect the current rotational position of the control shaft 21. According to the engine operation state and the input (VEL control shaft actual position signal) from the rotational position sensor, the control unit 53 performs drive control of the electric motor 51 so as to control the rotational position of the control shaft 21 and thereby vary the valve operating angles and valve lifts of the intake valves 3a, 3b.

Figure 11:
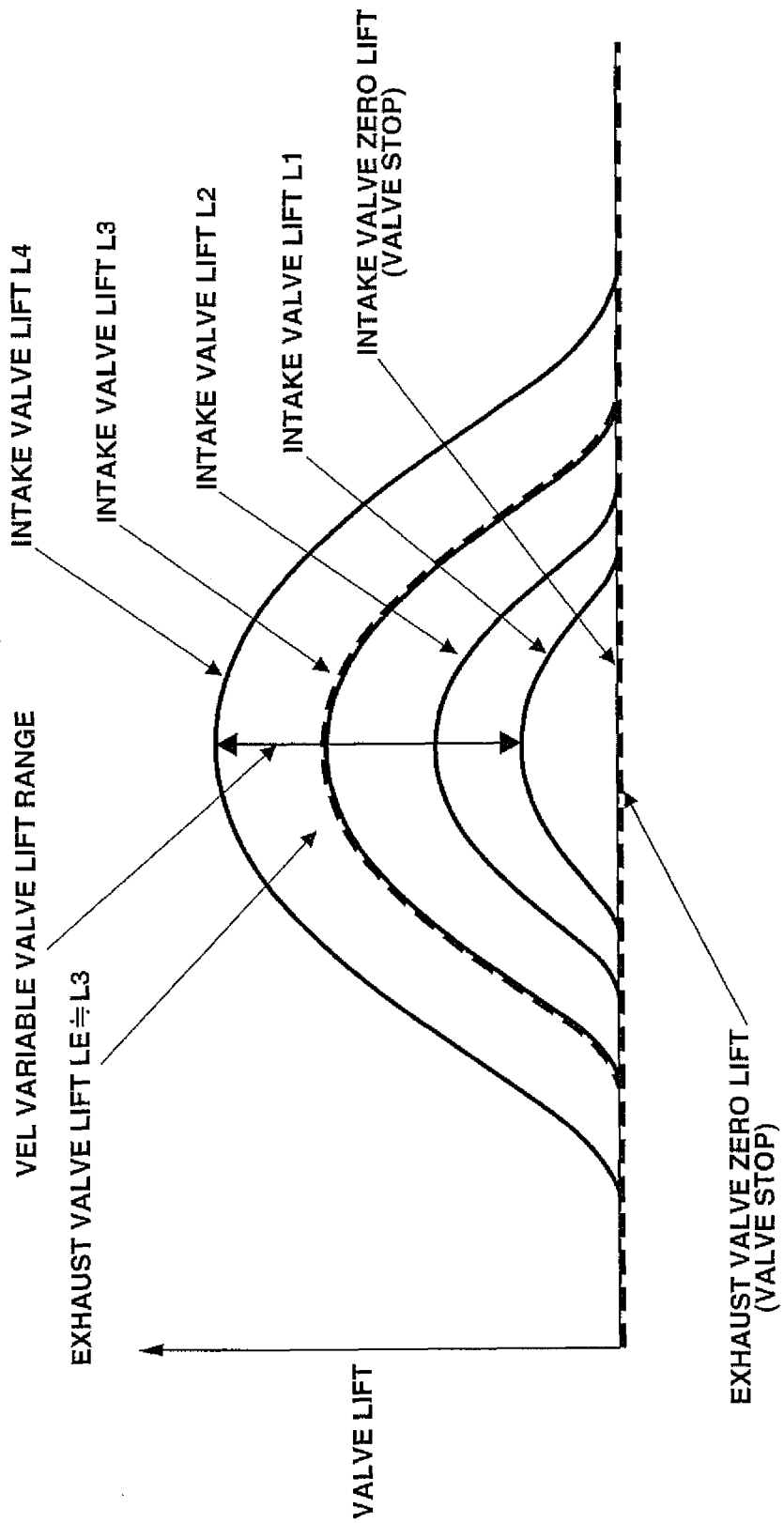
FIG. 11 is a diagram showing valve lift characteristics of the intake and exhaust valve according to the one embodiment of the present invention.

As shown in FIG. 11, the valve lifts of the intake valves are varied within the range from a minimum valve lift L1 to a maximum valve lift L4 in the case where the valve stop is not carried out by the lost motion mechanisms 11.

Figure 9:
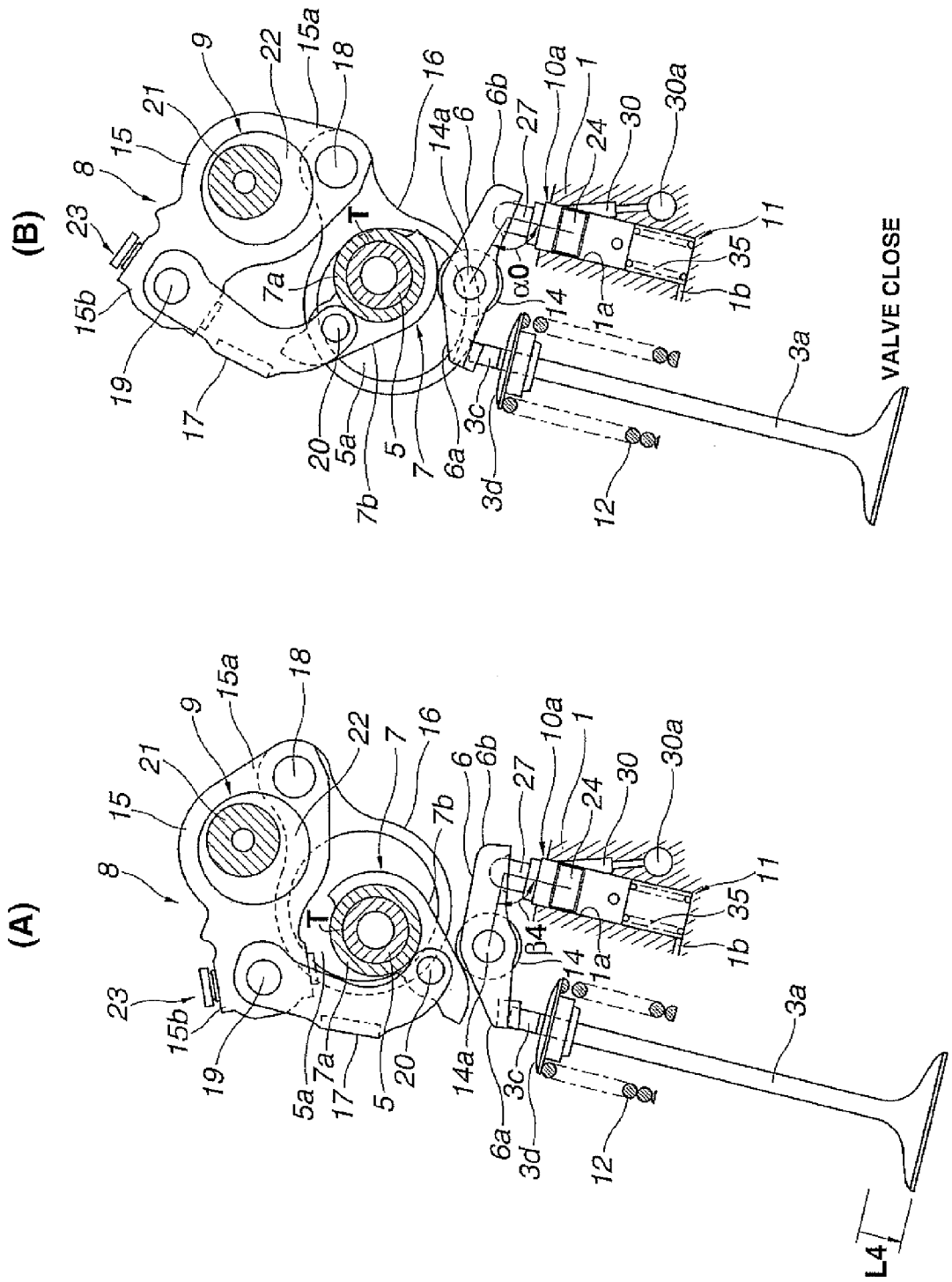
FIGS. 9A and 9B are schematic views showing the operations of the intake-side first or second hydraulic lash adjuster in a valve open state and in a valve close state in the case where the valve lift of the intake valve in the cylinder #1 is set to a maximum valve lift (L4) according to the one embodiment of the present invention.
Figure 10:
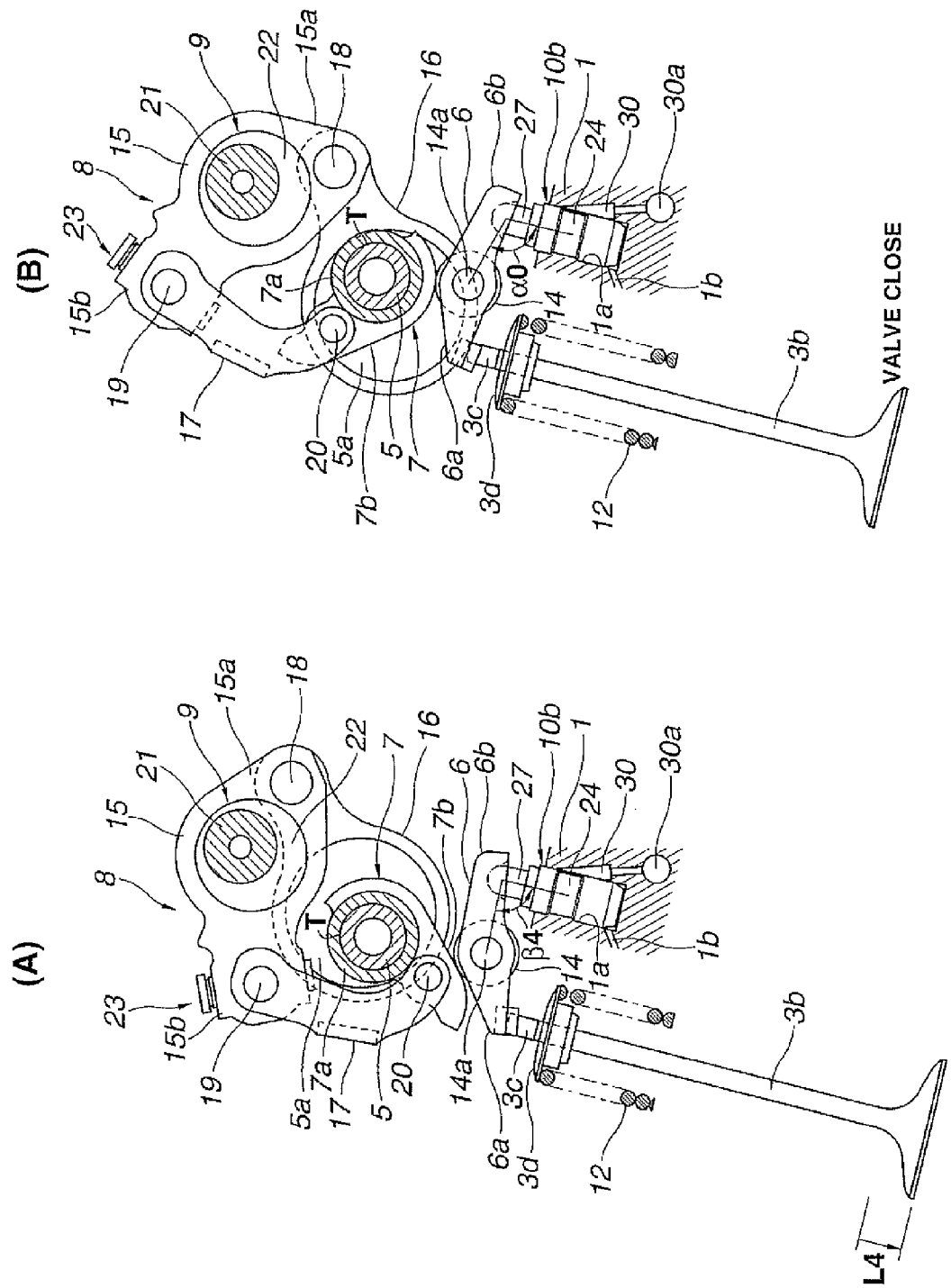
FIGS. 10A and 10B are schematic views showing the operations of the intake-side third or fourth hydraulic lash adjuster in a valve open state and in a valve close state in the case where the valve lift of the intake valve in the cylinder #2 is set to a maximum valve lift (L4) according to the one embodiment of the present invention.

In the case where the valve lifts of the intake valves are set to a maximum valve lift L4, the intake VEL system operates as shown in FIGS. 9 and 10. FIG. 9 shows the operations of the intake VEL system on the deactivatable cylinder #1. FIG. 10 shows the operations of the intake VEL system on the normally activated cylinder #2. The basic operations of the intake VEL systems on the cylinders #1, #2 are the same although the cylinders #1, #2 are different in that: the lost motion mechanisms 11 are provided on the cylinder #1; and the lost motion mechanisms 11 are not provided on the cylinder #2.

Figure 6:
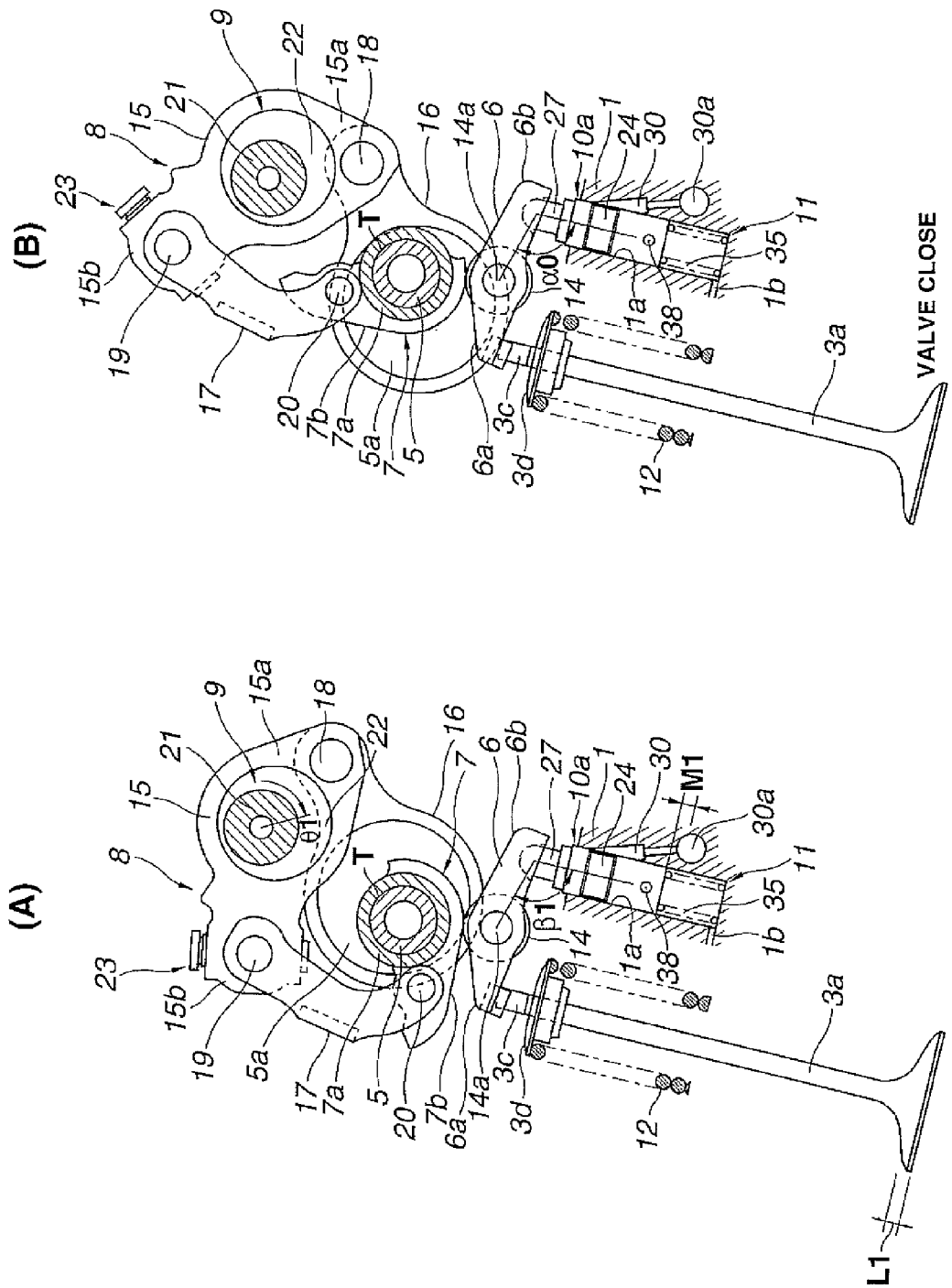
FIGS. 6A and 6B are schematic views showing the operations of the intake-side first or second hydraulic lash adjuster in a valve open state and in a valve close state in the case where the valve lift of an intake valve is set to L1 according to the one embodiment of the present invention.

FIG. 6 shows the operations of the intake VEL system on the deactivatable cylinder #1 in the case where the valve lifts of the intake valves are set to a minimum valve lift L1. Although the operations of the intake VEL system on the normally activated cylinder #2 is not shown in the drawings, the intake VEL system on the cylinder #2 operates in the same manner as the intake VEL system on the cylinder #1 as mentioned above.

The control unit 53 also outputs the control signal to a solenoid switching valve of the intake VTC system according to the engine operation state. Under the control signal from the control unit 53, the intake VTC system rotates a vane rotor to a retarded or advanced angle side relative to the crankshaft by the flow of the hydraulic pressure from the oil pump 54 through the solenoid switching valve so as to change the rotational phase of the drive shaft 5 and thereby control the operating and closing timings of the intake valves 3a, 3a, 3b 3b.

The exhaust valve drive apparatus on the cylinder #1, #2 is basically the same in structure as the intake valve drive apparatus on the cylinder #1, #2 except that a variable valve (VEL) system and a VTC system are not provided in the exhaust valve drive apparatus as shown in FIG. 2.

The internal combustion engine has two exhaust valves per cylinder arranged to open and close a pair of exhaust ports 60, 60 of the cylinder head 1.

More specifically, the first and second exhaust valves 61a, 61a are arranged in the cylinder #1; and the first and second exhaust valves 61b, 61b are arrange in the cylinder #2. It is noted that: the first exhaust valve is located on the front side of the cylinder; and the second exhaust valve is located on the rear side of the cylinder.

The exhaust valve drive apparatus has an exhaust cam shaft 63 arranged over the respective cylinders in the front-rear direction of the internal combustion engine and having egg-shaped rotation cams 63a mounted on an outer circumferential surface of the exhaust cam shaft 63 for opening the intake valves 61a, 61b against the spring force of valve springs 62 and swing arms 64 interposed between the exhaust valves 61a, 61b and the rotation cams 63a. By this exhaust valve drive apparatus, the exhaust valves 61a, 61b are driven to be opened and closed at a constant valve lift LE.

Further, the exhaust valve drive apparatus has hydraulic lash adjusters supported as pivot members (pivots) on the cylinder head 1 so as to adjust the clearances between the swing arms 64 and the exhaust valves 61a, 61a, 61b, 61b and between the swing arms 64 and base circle regions of the rotation cams 63a to zero lash. In the present embodiment, four first to fourth hydraulic lash adjusters are arranged on the exhaust valve side. More specifically, the first and second hydraulic lash adjusters 65a, 85a are arranged on the cylinder #1; and the third and fourth hydraulic lash adjusters 65b, 65b are arranged on the cylinder #2.

It is noted that: the first hydraulic lash adjuster 65a is located on the front side of the cylinder #1; the second hydraulic lash adjuster 65a is located on the rear side of the cylinder #1; the third hydraulic lash adjuster 65b is located on the front side of the cylinder #2; and the fourth hydraulic lash adjuster 65b is located on the rear side of the cylinder #2.

The exhaust valve drive apparatus also has two lost motion mechanisms 11 provided to the exhaust-side first and second hydraulic lash adjusters 65a, 65a on the cylinder #1 as in the case of the intake-side first and second hydraulic lash adjusters 65a, 65a on the cylinder #1. As in the case of the intake-side third and fourth hydraulic lash adjusters 10b, 10b on the cylinder #2, lost motion mechanisms are not provided to the exhaust-side third and fourth hydraulic lash adjusters 65b, 65b on the cylinder #2.

As the lost motion mechanisms 11 on the exhaust valve side are structurally the same as the lost motion mechanisms 11 on the intake valve side, the respective parts and portions of the lost motion mechanisms 11 on the exhaust valve side are designated by the same reference numerals as above to omit detailed explanations thereof. The lost motion mechanisms 11 includes cylindrical sliding holes 34 formed continuously to bottom ends of the retaining holes 1a, lost motion springs 35, 35 elastically held between bottom walls of the sliding holes 34 and bottom surfaces of the bodies 24 to bias the first and second hydraulic lash adjusters 65*a* (10*a*), 65*a* (10*a*) upwardly and restriction units 36 that restrict lost motion of the first and second hydraulic lash adjusters 65*a* (10*a*), 65*a* (10*a*).

The valve lifts of the exhaust valves 61*a*, 61*a* in the cylinder #1, on which the lost motion mechanisms 11 are provided, are set to zero lift as shown by a broken line in FIG. 11 in the case where the valve stop is carried out. In the case where the valve stop is not carried out, the peak valve lifts of the exhaust valves 61*a*, 61 in the cylinder #1 are set constant at LE. This peak lift LE is herein set substantially equal to a relatively large middle valve lift L3 of the intake valves 3*a*, 3*b* in the cylinder #1, #2 as indicated by a solid line in FIG. 11 but smaller than a maximum valve lift L4 of the intake valves 3*a*, 3*b* in the cylinder #1, #2.

As shown in FIG. 8B, the angle α3 between the swing arm 64 and the lost motion direction is relatively large as the amount M3 of lost motion caused by the lost motion mechanism 11 on the exhaust valve 65*a*, 65*b* in the cylinder #1 is relatively great. The angle α3 is herein defined as the angle between a line connecting the pivot point of the swing arm and the rotation center of the roller and an axis of the hydraulic lash adjuster as the lost motion direction.

As long as the angle is of the order of α3, however, it is possible to perform smooth lost motion operation without floating of the concave contact part of the swing arm 64 from the top end of the lash adjuster 65*a*. Namely, the lost motion amount M3 (angle α3) is in the range that allows smooth lost motion operation. If the lost motion amount M3 (angle α3) becomes further increased, the contact between the lash adjusters and the swing arms becomes uneven or local so that it may not be possible to perform smooth lost motion operation due to the occurrence of displacement or floating of the swing anus from the lash adjusters. In view of such a problem, the lost motion amount (angle) is limited to be equal to or smaller than M3 (α3).

Figure 8:
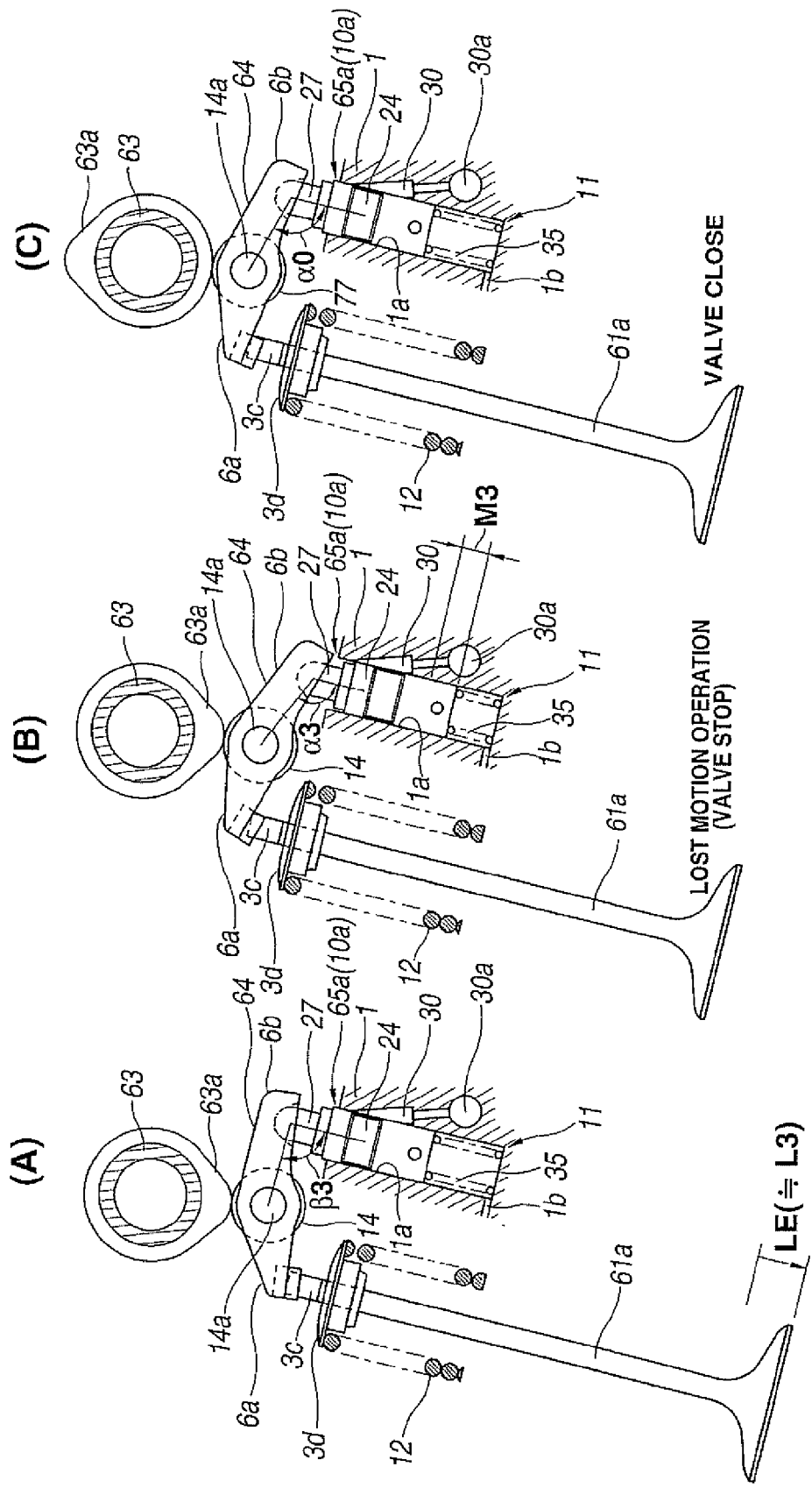
FIG. 8A is a schematic view showing the operations of an exhaust valve in the cylinder #1 in a valve open state without lost motion of the exhaust-side first or second hydraulic lash adjuster.
FIG. 8B is a schematic view showing the operations of the exhaust valve during lost motion of the exhaust-side first or second hydraulic lash adjuster.
FIG. 8C is a schematic view showing the operations of the exhaust valve in a valve close state without lost motion of the exhaust-side first or second hydraulic lash adjuster.

The exhaust valve drive system on the cylinder #1 operates as shown in FIG. 8. FIG. 8A shows the operations of the exhaust valve drive system in a state where the first, second exhaust valve 61*a*, 61*a* is driven at a relatively large constant valve lift LE (≈L3). FIG. 8B shows the operations of the exhaust valve drive system in a state where the lost motion of the first, second hydraulic lash adjuster 65*a*, 65*a* is caused by the lost motion mechanism 11 (valve stop state). FIG. 8C shows the operations of the exhaust valve drive system in a valve close state where the first, second exhaust valve 61*a*, 61*a* is closed.

The exhaust-side third and fourth hydraulic lash adjusters 65*b*, 65*b* on the cylinder #2, on which the lost motion mechanisms 11 are not provided, are the same in structure and operation to the intake-side third and fourth hydraulic lash adjusters 10*b*, 10*b* on the cylinder #2 as shown in FIG. 4.

As the cam profiles of the rotation cams 63*a* are the same, both of the valve lifts of the exhaust valve 61*a*, 61*a* in the cylinder #1 and the valve lifts of the exhaust valves 61*b*, 61*b* in the cylinder #2 are fixed at a valve lift LE.

As shown in FIG. 8A, the angle β3 between the swing am and the lost motion direction at the peak lift of the exhaust valve is close to an ideal value of 90°. There is thus unlikely to occur lateral displacement or disengagement of the swing arm from the top end of the hydraulic lash adjuster on the exhaust valve side even in the occurrence of valve jumping in a high-rotation engine operation state. Furthermore, the angle β between the swing arm and the lost motion direction at the peak lift of the intake valve is β1 in the case where the valve lift of the intake valve is set to L1 as shown in FIG. 6A and β4 in the case where the valve lift of the intake valve is set to L4 as shown in FIGS. 9A and 10. Both of these angles are close to an ideal value of 90°. There is thus also unlikely to occur disengagement etc. of the swing arm on the intake valve side.

[Operations of Variable Valve Device]

The operations of the variable valve device of the present embodiment will be explained below.

Figure 12:
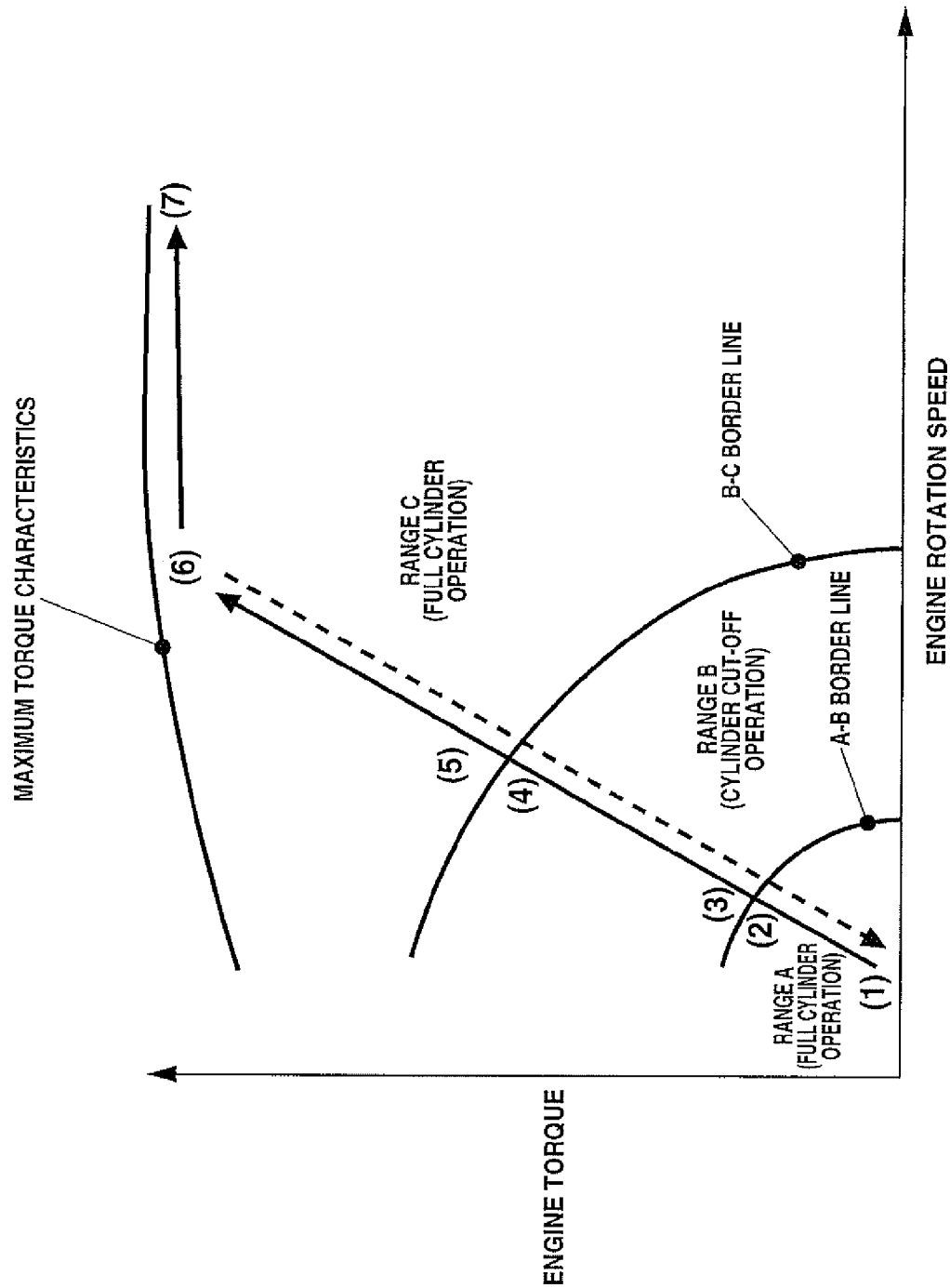
FIG. 12 is a map of engine rotation speed and torque, showing a full cylinder operation range and a cylinder cut-off operation range, according to the one embodiment of the present invention.
Figure 13:
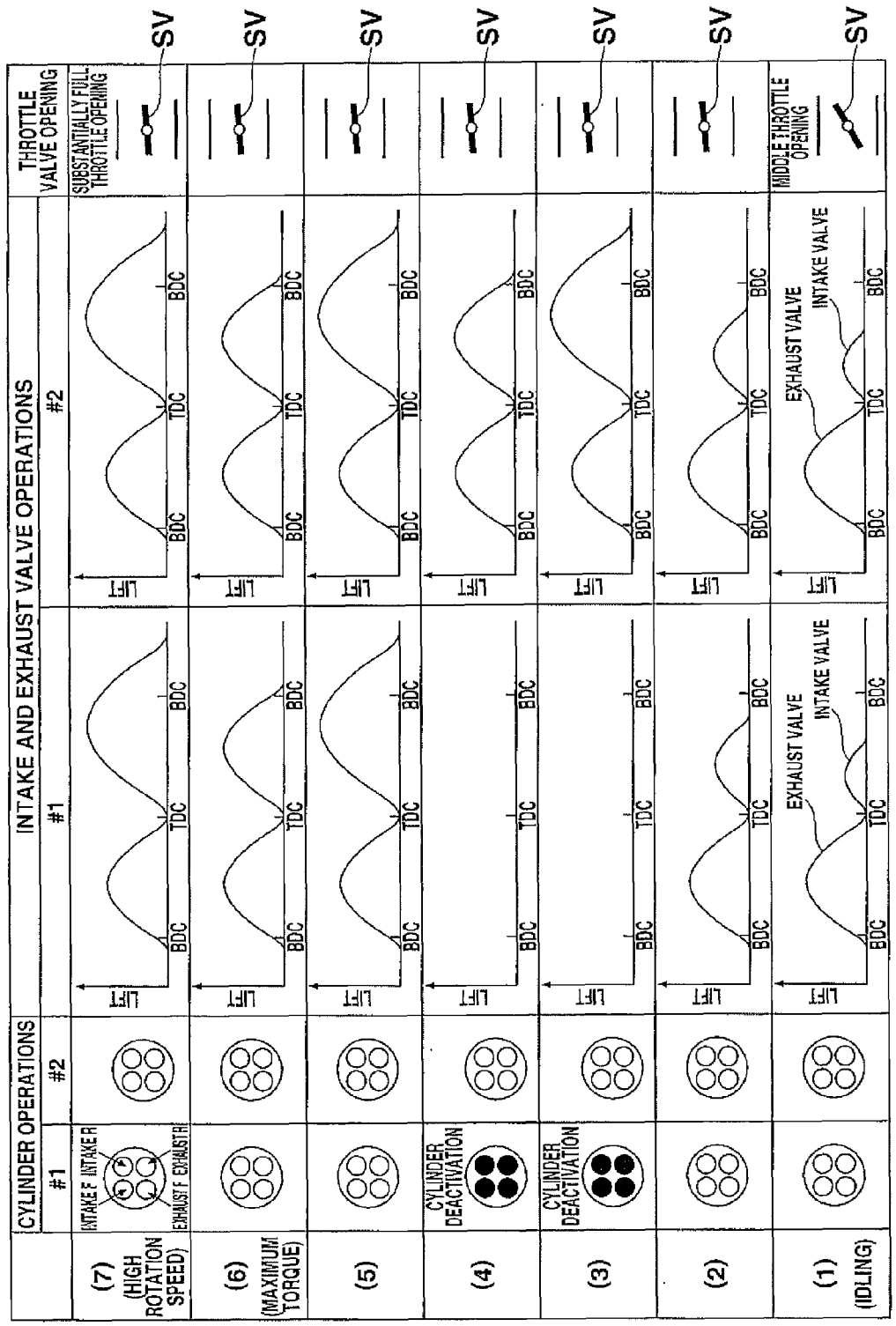
FIG. 13 is a diagram showing valve lift characteristics of the intake and exhaust valves in the cylinders #1 and #2 in the respective engine operation ranges.

In the present embodiment, the internal combustion engine is controlled to perform: full cylinder operation without deactivation of the cylinders #1, #2 in an engine idling state and a low-rotation low-load operation state (operation range A; operation states (1), (2)); cylinder cut-off operation with deactivation of the cylinder #1 in a low/middle-rotation or low/middle-load operation state (operation range B; operation states (3), (4)) in which engine rotation speed or load is increased to a certain level; and full cylinder operation in an acceleration state and a high-rotation or high-load operation state (operation range C; operation states (5) to (7)) as shown in FIGS. 12 and 13.

In the engine idling state (operation range A of FIG. 12), for example, the electric motor 51 is rotated under the control signal from the control unit 53. When the rotational torque of the electric motor 51 is transmitted to the control shaft 21 via the ball screw mechanism 52, the control shaft 21 rotates to cause rotation of the control cams 22 in one direction such that the centers of the control cams 22 turn about the axis of the control shaft 21 at the same radius as shown in FIGS. 6A and 6B. With such rotation, the large-thickness portions of the control cams 22 move away from the drive shaft 5 toward the lower right side in the drawings. Then, the other end portions 15*b* of the rocker arms 15 and the pivot points (coupling pins 19) of the link rods 17 move upward relative to the drive shaft 5 to forcibly pull up the cam nose portions of the swing cams 7 by the other end portions 15*b* of the rocker arms 15 through the link rods 17.

When the drive cam 5*a* rotates to lift up the one end portions 15*a* of the rocker arms 15 through the link arms 16, this lift is transmitted to the swing cams 7 and the swing arms 6 through the link rods 17. The intake valves 3 are accordingly opened at a small valve lift L1 against the spring reaction force of the valve springs 12 as shown in FIGS. 6 and 11.

When the internal combustion engine shifts into the high-rotation high-load operation state (operation range C of FIG. 12), the electric motor 51 is rotated in the reverse direction under the control signal from the control unit 53. When the ball screw mechanism 52 is rotated in the same direction as the electric motor 51, the control shaft 21 causes rotation of the control cams 22 in the other direction such that the centers of the control cams 22 move toward the lower left side in FIGS. 9A and 9B (cylinder #1) and FIGS. 10A and 10B (cylinder #2).

Then, the rocker arms 15 pivot in the counterclockwise direction to forcibly pull down the cam nose portions of the swing cams 7 by the other end portion 15*b* through the link rods 17. As the swing cams 7 pivot in the counterclockwise direction by a given amount from the position of FIGS. 6A and 6B, the position of contact of the cam surfaces 7*b* of the swing cam 7 and the outer circumferential surfaces of the rollers 14 of the swing arms 5 is changed to the cam nose side (cam lift side).

When the drive cam 5*a* rotates to lift up the one end portions 15*a* of the rocker arms 15 through the link arms 16, the intake valves 3 are opened against the spring reaction force of the valve spring 12. As shown in FIGS. 9 to 11, the valve lifts of the intake valves 3 are continuously varied up to a maximum valve lift L4 with increase in engine rotation speed. It is thus possible to improve engine output performance by increase of intake filling efficiency in the high-rotation operation state.

[Operations of Lost Motion Mechanism]

When the internal combustion engine shifts into the operation range B, which exceeds the operation range A such as engine idling state or low-rotation low-load operation state, i.e., becomes higher in engine rotation speed or load than the operation range A, the control signal is outputted from the control unit 53 to the solenoid switching valve 55. The large hydraulic pressure discharged from the oil pump 54 is introduced as the hydraulic pressure signal to the restriction holes 39 of the respective lost motion mechanisms through the oil passages 43.

Upon receipt of such a large hydraulic pressure signal, the restriction pins 41 move back against the spring force of the return springs 42. The lock of the intake-side first and second hydraulic lash adjusters 10a, 10a and the exhaust-side first and second hydraulic lash adjuster 65a, 65a relative to the cylinder head 1 is released when the front end portions 41a of the restriction pins 41 come out of the restriction holes 39.

The first and second hydraulic lash adjusters 10a (65a), 10a (65a) hence perform lost motion with repeated up and down strokes between the retaining holes 1a and the sliding holes 34. By such lost motion, the first and second intake valves 3a, 3a and the first and second exhaust valves 61a, 61a are closed (stopped) for deactivation of the cylinder #1.

Herein, consideration is given to the lift operations of the intake valve up until the valve stop state. It is now assumed that the intake valve shifts to the valve stop state from the state where the valve lift of the intake valve is set to a minimum valve lift L1. In this case, valve stop control is executed after the swing cam 7 is changed from a zero lift position (valve close position) of FIG. 6B to a maximum valve opening lift (L1) position of FIG. 6A by the intake valve drive apparatus. Under valve stop control, the first, second hydraulic lash adjuster 10a, 10a performs lost motion only by a stroke amount M1 as shown in FIG. 6A even by the maximum pivotal movement of the swing cam 7. As a result, the intake valve shifts to the valve stop state with actually no valve lift.

Figure 7:
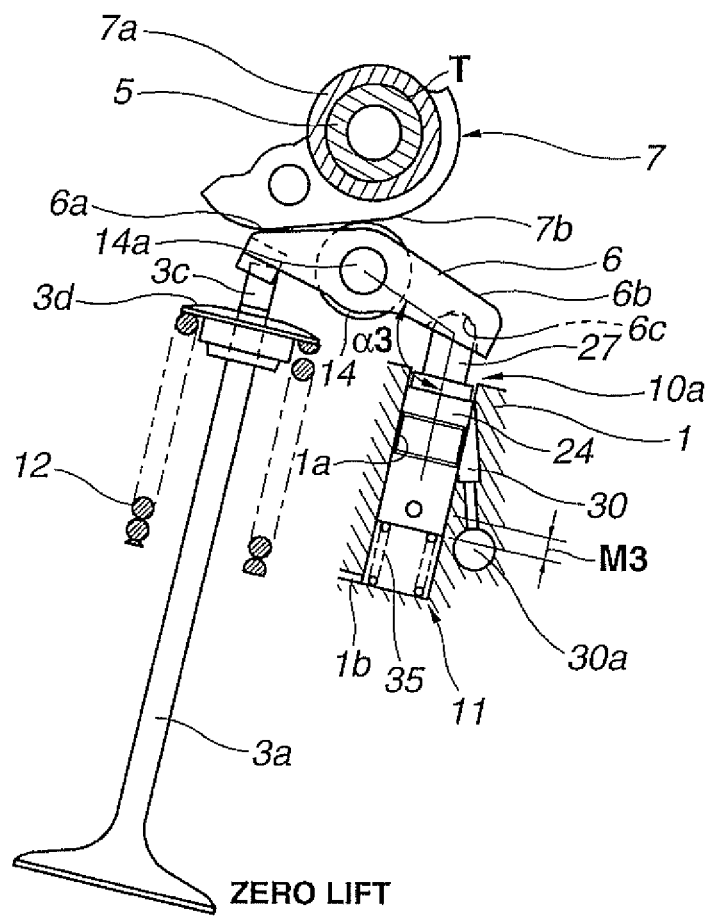
FIG. 7 is a schematic view showing the operations of a lost motion mechanism on the intake-side first or second hydraulic lash adjuster at the time of shifting to a valve stop state from a state in which the valve lift of the intake valve is set to L3 according to the one embodiment of the present invention.

In the case where the valve lift of the intake valve before the valve stop state is set large by rotation of the control shaft, the lost motion amount is increased at the valve stop. For example, the lost motion amount is increased to M3 as shown in FIG. 7 at the time of shifting to the valve stop state from the state where the valve lift of the intake valve is set to L3. At this time, the open angle α between the swing arm 6, 6 and the first, second hydraulic lash adjuster 10a, 10 (see FIG. 7) is increased to α3 at a peak lift position of the swing cam 7. The open angle α3 is of the same order as in the valve stop state of the exhaust valve (lost motion amount M3) as mentioned above and is not at an excessive level.

It is thus possible to achieve smooth valve stop operation/lost motion operation even when the swing cam 7 is in the peak lift position (maximum valve opening position).

Next, it is assumed that the valve lift of the intake valve is increased to L4 before the valve stop state. When the intake valve shifts from such an operation state to the valve stop state, the lost motion amount is further increased to M4. The open angle is increased to α4 with increase in lost motion amount. As the contact between the top end of the lash adjuster and the concave part of the swing arm becomes uneven or local, it may not be possible to perform smooth lost motion operation due displacement or floating of the swing arm from the lash adjuster. At worst, there may occur disengagement of the swing arm.

In order to avoid the above problem, the valve lift of the intake valve is decreased to be equal to or smaller than L3 by the intake VEL system before the valve stop state in the present embodiment. By shifting to the valve stop state from the state where the valve lift of the intake valve is equal to or smaller than L3, the maximum open angle α can be limited to be equal to or smaller than α3 (that is, the lost motion amount M can be set equal to or smaller than M3).

It is therefore possible to sufficiently increase the maximum valve lift of the intake valve to L4 and set the valve lift of the intake valve larger than the valve lift L3 of the exhaust valve while limiting the maximum open angle α to be equal to or smaller than the exhaust-valve-side open angle α3 for smooth valve stop operation/lost motion operation.

For deactivation of the cylinder #1, the exhaust-side first, second hydraulic lash adjuster 65a, 65a on the cylinder #1 performs lost motion by a stroke amount M3 as shown in FIGS. 8A to 8C in synchronism with the valve stop control of the intake valves so that the exhaust valve shifts to the valve stop state with actually no valve lift.

On the other hand, both of the intake-side and exhaust-side hydraulic lash adjusters 10b, 10b, 65b, 65b on the normally activated cylinder #2 serve as the pivot points of the swing arms 6, 64. The intake and exhaust valves 3b, 3b, 61b, 61b are lifted up and down as usual.

As mentioned above, the control unit 53 controls the actuator 50 of the intake VEL system, the hydraulic switching valve (solenoid switching valve) of the intake VTC system and the solenoid switching valve 55 of the lost motion mechanisms 11 according to the engine operation conditions so as to vary the valve lift and relative rotational phase of the intake valves 3a, 3a, 3b, 3b in the cylinders #1, #2 and to drive and stop the intake and exhaust valves 3a, 3a, 61a, 61a in the cylinder #1 for activation and deactivation of the cylinder #1.

FIG. 12 is a map showing the number of the cylinders activated in the present embodiment. In the map, the horizontal axis represents engine rotation speed; and the vertical axis represents engine load (torque).

Full cylinder operation is performed in the low-rotation low-torque operation range (operation range A) such as engine idling state as mentioned above. If cut-off operation, during which the combustion stroke becomes longer, is performed in the low-rotation operation range, the absolute time of the combustion stroke increases so that there occur high engine vibration due to variation in engine rotation. Thus, fuel-efficient cylinder cut-off operation is not applicable in the operation range A such as engine idling state where engine stability, quietness and low vibration are particularly required. It is inevitable to adopt full cylinder operation in the operation range A.

In the operation range B higher in engine rotation speed or load than the operation range A, the demand for engine stability, quietness and low vibration is lowered. Fuel-efficient cylinder cut-off operation is performed in this operation range B.

In the operation range C higher in engine rotation speed or load than the operation range B, engine output is required. Full cylinder operation is performed for increase of engine torque in this operation range C.

In FIG. 12, the solid arrow (from the operation state (1) to (2), from the operation state (3) to (4) and from the operation state (5) to (6) and then to (7)) indicates engine acceleration; the dashed arrow (from the operation state (6) to (5), from the operation state (4) to (3) and from the operation state (2) to (1)) indicates engine deceleration.

FIG. 13 shows the number of the cylinders activated and the operation status of the intake and exhaust valves in the respective operation states.

The operation state (1) refers to the engine idling state. In the present embodiment, the valve lift of the intake valve 3a, 3b is set to a sufficiently small valve lift L1 by the intake VEL system so as to increase intake flow rate and improve combustion for improvement of fuel efficiency.

Although it has been common practice to largely close the throttle valve SV and thereby develop the negative pressure in the cylinder for promotion of fuel aerification, fuel aerification can be promoted by increase of intake flow rate in the present embodiment. Further, the opening of the throttle valve SV is increased so as to decrease in-cylinder negative pressure and suppress increase of pumping loss for improvement of fuel efficiency in the present embodiment.

The operation state (2) refers to where engine rotation speed or load is slightly higher than in the engine idling state. Full cylinder operation is performed in this operation state (2). In the operation state (2), the valve lift of the intake valve is set to a small valve lift (L2), which is slightly larger than that in the operation state (1), so as to improve fuel aerification and combustion by increase of intake flow rate. Due to not only such improvement of fuel aerification and combustion by increase of intake flow rate but also improvement of combustion by increase of load, the throttle valve SV is substantially full open. Reduction of pumping loss and improvement of fuel efficiency can be achieved by so-called valve throttling.

Engine output can be increased sufficiently by increasing the maximum valve lift of the intake valve to a sufficient level L4 as mentioned above. When the valve lift of the intake valve is simply increased, however, fuel efficiency becomes deteriorated in the low-rotation low-load operation range A such as engine idling state. In the present embodiment, by contrast, the valve lift of the intake valve is decreased to a small valve lift (L1 to L2), which is smaller than the valve lift L3 of the exhaust valve, by the intake VEL system in the operation range A. By such small valve lift control, fuel efficiency can be improved effectively in the operation range A even though cylinder cut-off operation is not applicable. This operation range is low in engine load so that the influence of friction on fuel efficiency is large. A large fuel efficiency improvement effect can be obtained in terms of such valve friction reduction by small valve lift control as well as combustion improvement as mentioned above.

When the relative rotational phase of the intake valve 3a, 3b is slightly retarded by the intake VTC system change of intake valve opening timing, i.e., change of valve overlap can be suppressed to control change of in-cylinder remaining gas quantity and attain stable transient performance at the time of transition from the operation state (1) to the operation state (2).

When the lift curve of the intake valve is controlled to a retarded side by the intake VTC system with increase of valve lift in the operation states (1) to (7), change of valve overlap can be suppressed to control transient change of in-cylinder residual gas amount as in the case above. (Hereinafter, an explanation of the operations of the intake VTC system will be omitted.)

The operation state (3) refers to where engine rotation speed or load is slightly higher than in the operation state (2). As the operation state (3) is beyond the A-B border line, cylinder cut-off operation is initiated in this operation state (3). In cylinder cut-off operation, combustion is improved with increase of load per activated cylinder. Further, the sum of the areas of in-cylinder surfaces exposed to combustion gas is reduced by half (reduction of cooling loss). As a result, fuel efficiency can be improved. In the present embodiment, additional specific effects are obtained during cylinder cut-off operation.

In cylinder cut-off operation, the closing timing of the intake valve 3b, 3b becomes closer to the piston bottom dead center if the valve lift of the intake valve is slightly increased with increase of load per activated cylinder. There arises increase of pumping loss when the intake valve closing timing becomes closer to the piston bottom dead center. Even when the valve lift of the intake valve is insufficient, there also arises increase of pumping loss.

Hence, the valve lift of the intake valve is increased to a large valve lift L4 so that the closing timing of the intake valve 3b, 3b in the cylinder #2 is largely retarded over the piston bottom dead center in the operation state (3) as shown in FIG. 13.

It is possible by sufficient increase of the valve lift of the intake valve 3b, 3b and by sufficient retardation of the closing timing of the intake valve 3b, 3b to suppress pumping loss and adequately improve fuel efficiency in cylinder cut-off operation.

By retardation of the closing timing of the intake valve 3b, 3b, knocking resistance can be improved with decrease of effective compression ratio so as to advance ignition timing in the spark ignition engine as in the present embodiment and allow improvement of fuel efficiency.

Furthermore, torque generation can be reduced as the closing timing of the intake valve 3b, 3b becomes sufficiently retarded relative to the piston bottom dead center. This leads to widening of the fuel-efficient cylinder cut-off operation range, i.e., the A-B border line to the lower torque side for further improvement of vehicle fuel efficiency.

In cylinder cut-off operation, there arises a problem of engine rotation variation and vibration due to the occurrence of combustion in a less number of cylinder. In the present embodiment, however, the closing timing of the intake valve 3b, 3b is largely regarded over the piston bottom dead center. By such timing control, engine rotation variation and vibration can be effectively reduced with decrease of effective compression ratio.

To sum up, it is possible by increasing the maximum valve lift of the intake valve to L4 to not only increase engine output as mentioned above, but also allow further improvement of fuel efficiency during cylinder cut-off operation in the operation range B, widen the fuel-efficient cylinder cut-off operation range and reduce engine rotation variation and vibration.

As the operation range B is higher in combustion torque than the operation range A, the influence of friction on combustion is small in the operation range B. Thus, there is less influence on fuel efficiency even when valve drive friction is increased by large valve lift control.

In the present embodiment, specific effects are also obtained at the time of transition from the operation state (2) to the operation state (3).

Figure 14:
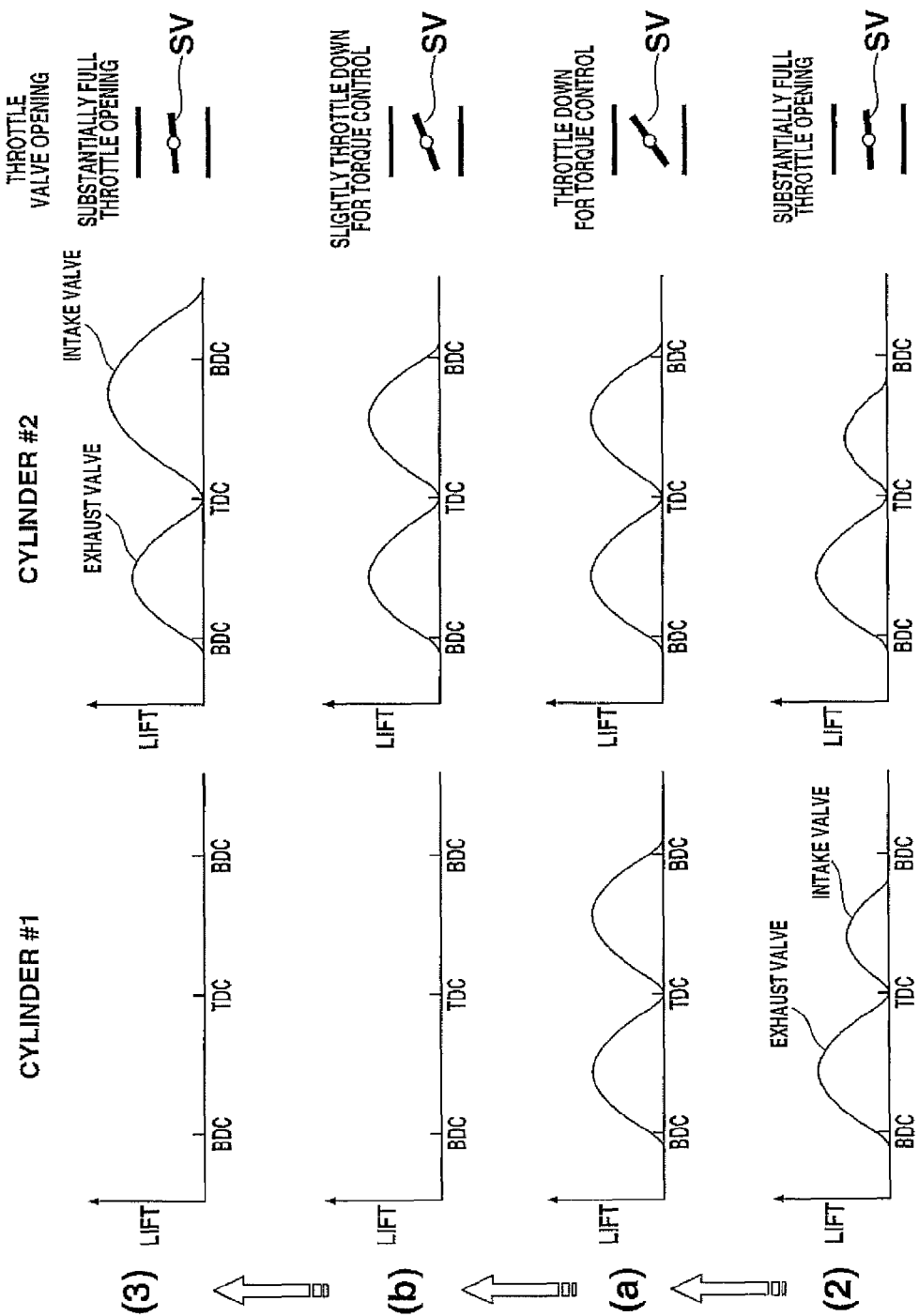
FIG. 14 is a diagram showing valve lift characteristics of the intake and exhaust valves in the cylinders #1 and #2 and opening characteristics of throttle valves at the time of transition from operation state (2) to operation state (3) of FIG. 12.

FIG. 14 shows a sequence of transition from the operation state (2) to the operation state (3). At the time of shift from full cylinder operation in the low torque/rotation range (operation range A) to cylinder cut-off operation in the higher torque/rotation range (operation range B), the valve lift of the intake valve is increased to a middle valve lift L3; and the opening of the throttle valve SV is decreased in advance of cylinder cut-off operation as shown in the operation state (a) of FIG. 14. It is possible by this control to increase the valve lift of the intake valve in advance for cylinder cut-off operation while suppressing increase of engine torque.

Subsequently, the operations of the intake and exhaust valves 3a, 3a, 61a, 61a in the deactivatable cylinder (cylinder #1) are stopped (fuel injection is also stopped in the deactivabable cylinder); and the opening of the throttle valve SV is increased as shown in the operation state (b) of FIG. 14 for suppression of engine torque chance.

By alternate switching between the state in which the intake and exhaust valves are opened and closed and the state (valve stop state) in which the intake and exhaust valves are stopped, no small valve lift curve exists in the middle stage of transition. There thus occurs no deterioration of transient engine performance due to small valve lift curve. The deterioration of transient engine performance herein refers to abrupt engine braking shock (pumping loss peak) caused by significant retardation of intake valve opening timing during transition or performance instability such as large change of intake air caused particularly at minimum valve lift. Such deterioration of transient engine performance can be prevented by the above alternate switching.

In order to achieve the valve stop state, it is conceivable to set the valve lift to zero lift by the VEL system. In such a case, the valve lift is continuously varied to show a small valve lift curve in the middle stage of transition and thereby a cause of deterioration of transient engine performance. In the present embodiment, however, this deterioration of transient engine performance can be prevented as mentioned above.

After that, the valve lift of the intake valve 3b, 3b in the activated cylinder #2 is largely increased so that the closing timing of the intake valve 3b, 3b in the activated cylinder #2 is retarded over the piston bottom dead center; and the opening of the throttle valve SV is increased to substantially full throttle opening for suppression of engine torque change as shown in operation state (3) of FIG. 14.

As the closing timing of the intake valve 3b, 3b is retarded by increase of valve lift (operating angle), fuel efficiency can be improved by reduction of pumping loss. Further, engine torque itself can be reduced so as to widen the fuel-efficient cylinder cut-off operation range to the lower engine torque or rotation speed side.

By retardation of intake valve closing timing, engine vibration and rotation variation, which becomes a problem in cylinder cut-off operation, can be prevented with decrease of effective compression ratio. This also leads to widening of the cylinder cut-off operation range.

It is conceivable to, in the operation state (3) of FIG. 14, control engine torque by slightly increasing the valve lift of the intake valve 3b and maintaining the closing timing of the intake valve 3b before the piston bottom dead center (so-called "early valve closing timing") in place of largely increasing the valve lift of the intake valve 3b and retarding the closing timing of the intake valve 3b over the piston bottom dead center. In that case, however, the following problem arises.

As the valve lift of the intake valve is maintained at a relatively small level, it is necessary in view of intake resistance to increase engine torque by retarding the closing timing of the intake valve 3b, 3b to the vicinity of the piston bottom dead center in response to increase of load per activated cylinder during cylinder cut-off operation. This results in disadvantages such as increase of pumping loss (deterioration of fuel efficiency), engine vibration and rotation variation by increase of effective compression ratio etc. so that it is not possible to widen the cylinder cut-off operation range.

Figure 15:
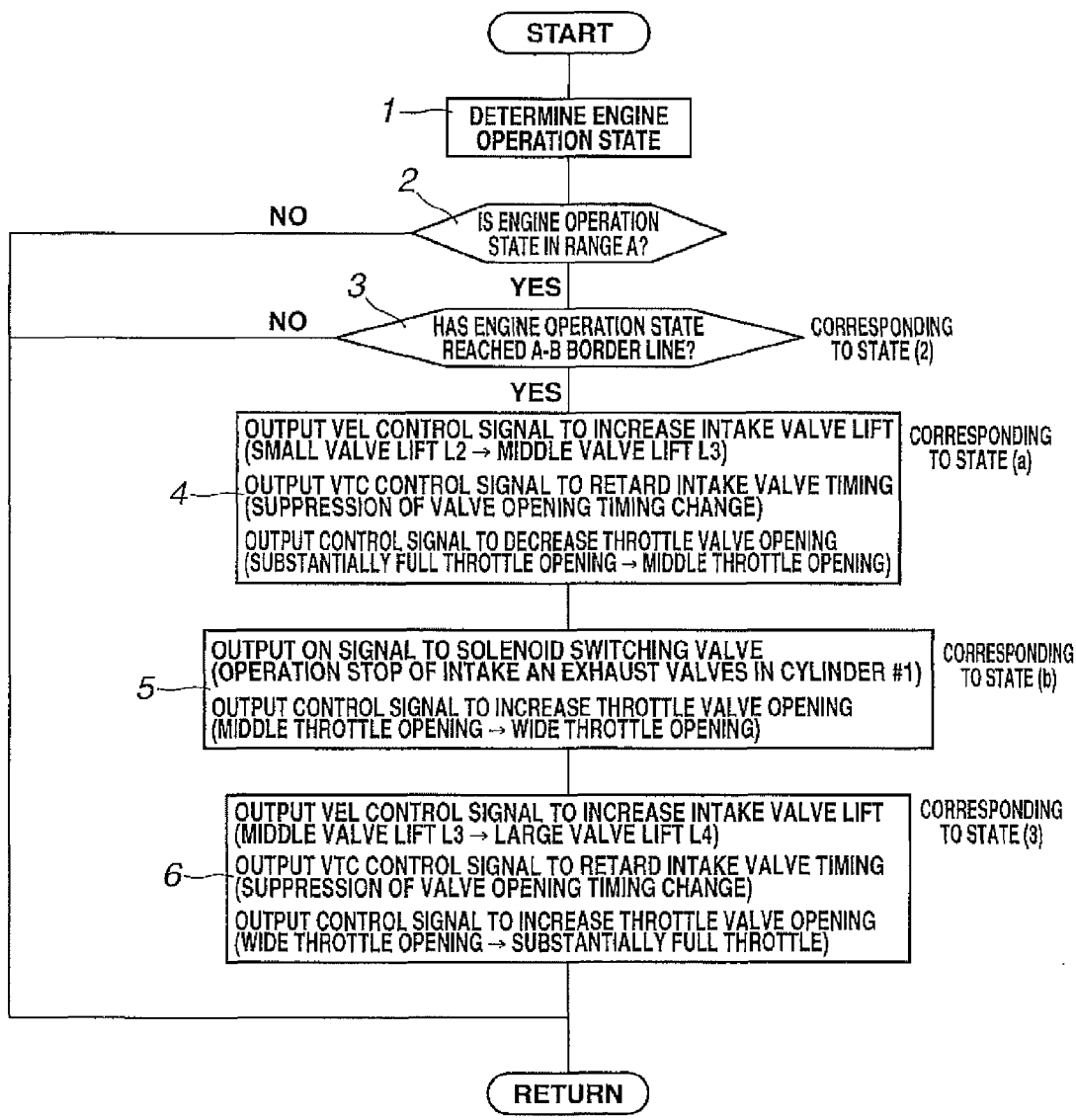
FIG. 15 is a flowchart of control for the transition from operation state (2) to operation state (3) of FIG. 12.

FIG. 15 shows a flowchart of control for the transition from the operation state (2) to the operation state (3).

At step 1, the current engine operation state (operation conditions) is determined by detection of the engine rotation speed, the engine load, the opening of the throttle valve SV and the like based on the inputs from various sensors such as crank angle sensor.

At step 2, it is judged whether the current engine operation state is in the operation range A of FIG. 12. The control returns when the current engine operation state is judged as not being in the operation range A. When the current engine operation state is judged as being in the operation range A, the control proceeds to step 3.

At step 3, it is judged whether the engine operation state has reached the A-B border line of FIG. 12. The control returns when the engine operation state is judged as not having reached the A-B border line. When the engine operation state is judged as having reached the A-B border line, the control proceeds to step 4.

At step 4, the control signals are outputted to increase the valve lift of the intake valve 3a, 3b from L2 to L3 by the intake VEL system, set the valve timing of the intake valve 3a, 3b to the retarded side by the intake VTC system (for suppression of opening timing change) and decrease the opening of the throttle valve SV (from substantially full throttle opening to middle throttle opening).

At step 5, the ON signal is outputted to the solenoid switching valve 55 to stop the intake and exhaust valves 3a, 3a, 61a, 61a in the cylinder #1. The control signal is also outputted to slightly increase the opening of the throttle valve SV (from middle throttle opening to relatively wide throttle opening).

At step 6, the control signals are outputted to increase the valve lift of the intake valve from L3 to L4 by the intake VEL system, set the closing timing of the intake valve to the retarded side by the intake VTC system (for suppression of closing timing change) and increase the opening of the throttle valve SV (from relatively wide throttle opening to substantially full throttle opening). With this, the control process exits.

The operation state (4) of FIGS. 12 and 13 refers to where engine torque or rotation speed is higher than in the operation state (3) in the cylinder cut-off operation range. In the operation state (4), the closing timing of the intake valve 3b, 3b continuously gradually becomes closer to the piston bottom dead center so as to increase intake filling efficiency in response to required engine torque, while maintaining the opening of the throttle valve SV at substantially full throttle opening. It is thus possible to improve fuel efficiency while suppressing pumping loss.

With increase in required engine torque, there occurs knocking due to insufficiency of engine torque absolute value and increase of effective compression ratio. As the required engine torque can no longer be achieved in cylinder cut-off operation, full cylinder operation is initiated in the operation state (5).

As shown in the operation state (5) of FIG. 13, the closing timing of the intake valve 3a, 3b is largely retarded by large valve lift control (large operating angle control) so as to increase the opening of the throttle valve SV, while suppressing required intake filling efficiency in full cylinder operation, and allow reduction of pumping loss and improvement of fuel efficiency even in full cylinder operation. In the present embodiment, specific effects are also obtained at the time of transition from the operation state (4) to the operation state (5).

Figure 16:
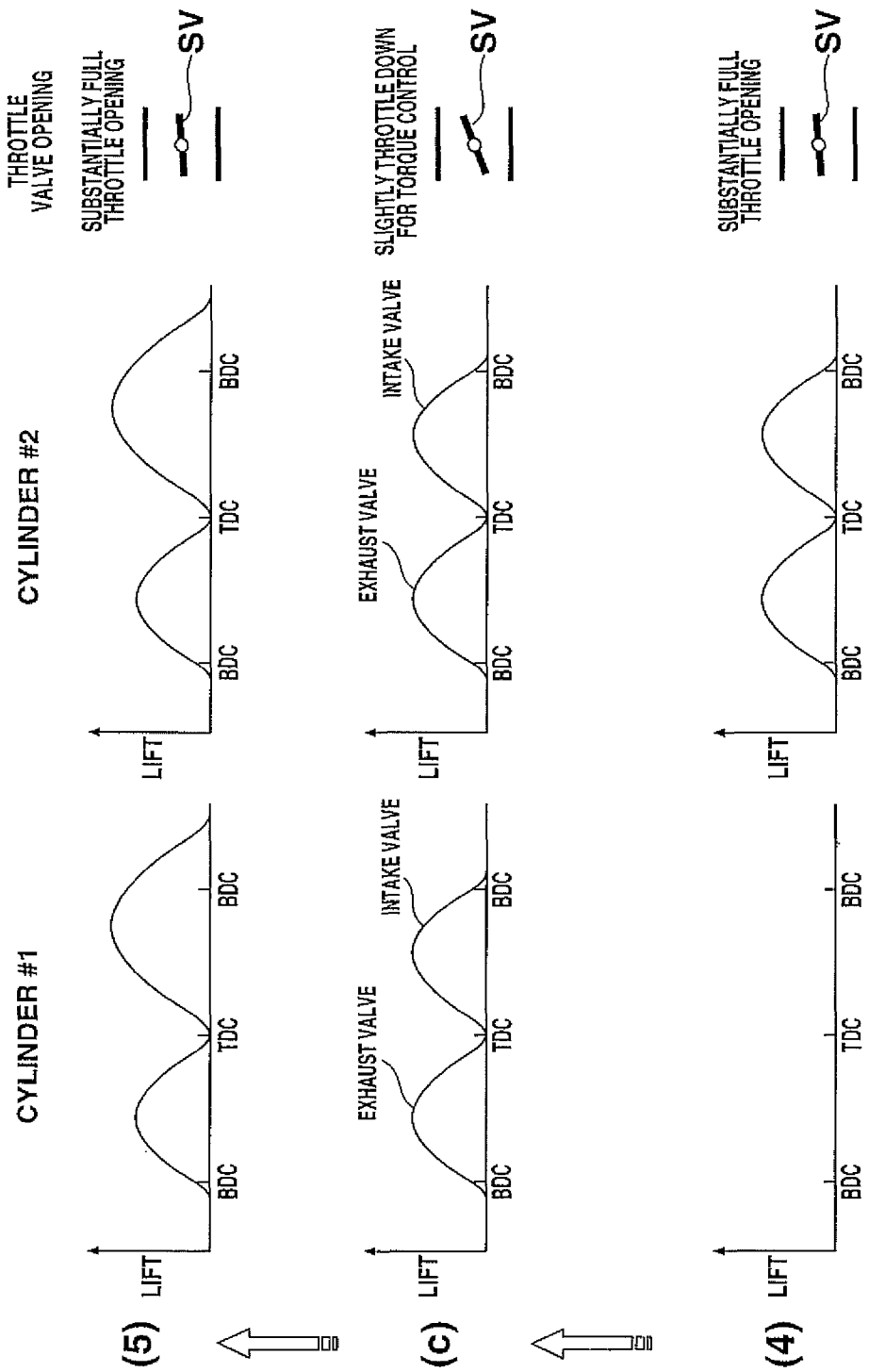
FIG. 16 is a diagram showing valve lift characteristics of the intake and exhaust valves in the cylinders #1 and #2 and opening characteristics of the throttle valves at the time of transition from operation state (4) to operation state (5) of FIG. 12.

As seen in FIG. 16, which shows a sequence of transition from the operation state (4) to the operation state (5), no small valve lift exists in the middle stage of transition from the cylinder cut-off operation state (4) to the full cylinder operation state (c). In the absence of small valve lift, there occurs deterioration of transient engine performance such as abrupt engine braking shock (pumping loss peak) or performance instability as mentioned above. This effect is the same as that obtained in the absence of small valve lift in the middle stage of transition from the full cylinder operation state (a) to the cylinder cut-off operation state (b) as mentioned above. Then, the opening of the throttle valve SV is slightly decreased for suppression of engine torque change in full cylinder operation.

In the operation state (5), the valve lift (operating angle) of the intake valve is increased so that the closing timing of the intake valve in the activated cylinder is sufficiently retarded over the piston bottom dead center so as to suppress intake filling efficiency and increase the opening of the throttle valve SV. The occurrence of change in torque, called torque shock, can be thus avoided in this transient operation state.

Figure 17:
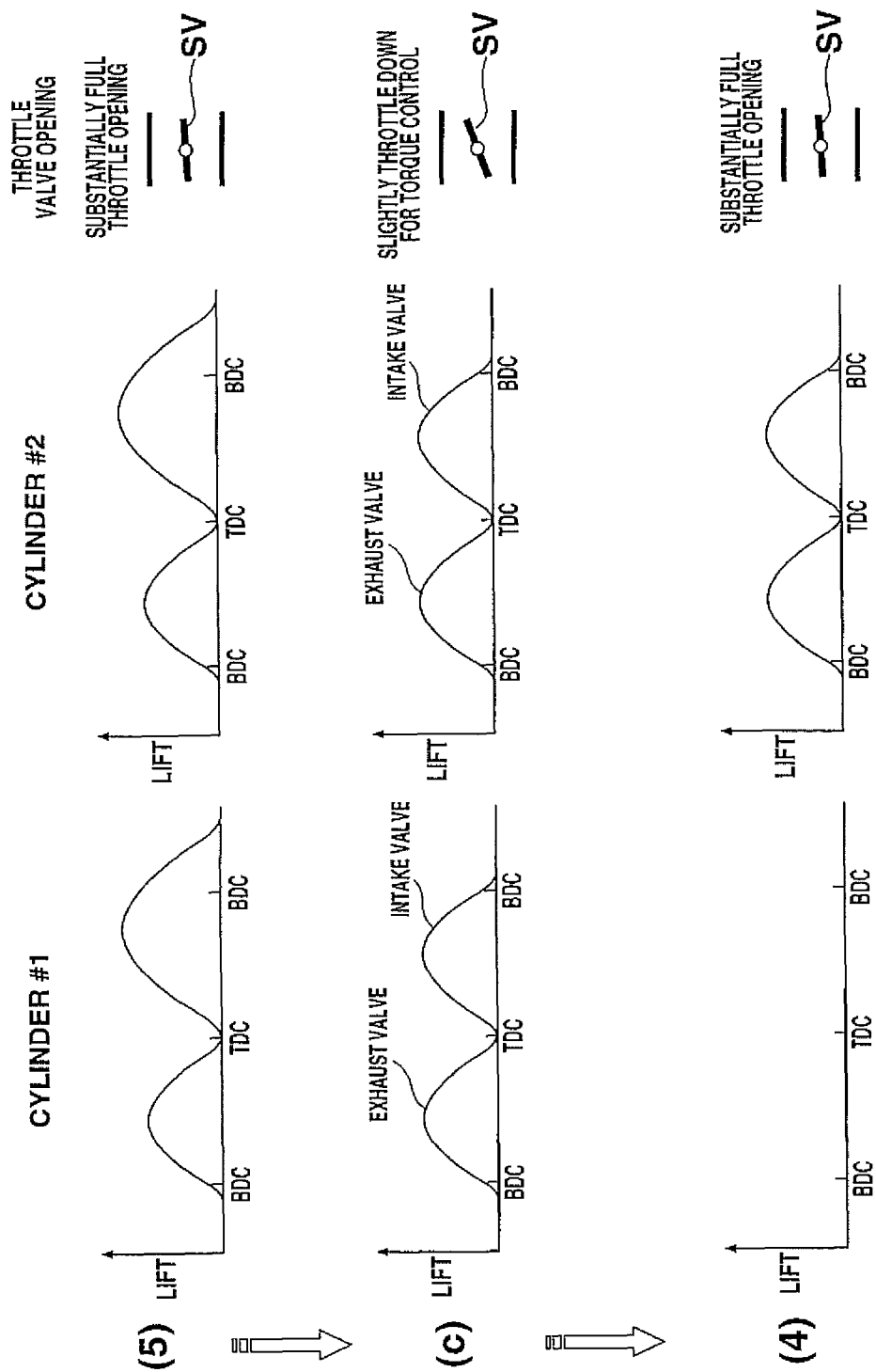
FIG. 17 is a diagram showing valve lift characteristics of the intake and exhaust valves in the cylinders #1 and #2 and opening characteristics of the throttle valves at the time of transition from operation state (5) to operation state (4) of FIG. 12.

Next, consideration is given to the deceleration operations of the engine (as indicated by the dashed arrow of FIG. 12). FIG. 17 shows a sequence of deceleration from the operation state (5) to the operation state (4).

In the operation state (5), full cylinder operation is performed at a large valve lift. By switching from the large-valve-lift full cylinder operation state (5) to the cylinder cut-off operation state (4) via the middle-valve-lift full cylinder operation state (c), rather than directly switching from the full cylinder operation state (5) to the cylinder cut-off operation state (4), specific effects are obtained.

If the intake valve directly shifts to the valve stop state from the state where the intake valve of the intake valve is set to a large valve lift L4, the lost motion amount exceeds an allowable level M3 so that it is not possible to perform smooth lost motion operation. There occurs floating or lateral displacement of the concave contact part of the swing arm 6, 6 from the top end of the lash adjuster 10a, 10a on the cylinder #1. At worst, there occurs engine failure due to disengagement of the swing arm 6.

In the present embodiment, the intake valve shifts to the valve stop state after controlling the valve lift of the intake valve to a middle valve lift L3 by the intake VEL system. It is thus possible to limit the lost motion amount to be equal to or smaller than the allowable level M3 and perform smooth lost motion operation.

Figure 18:
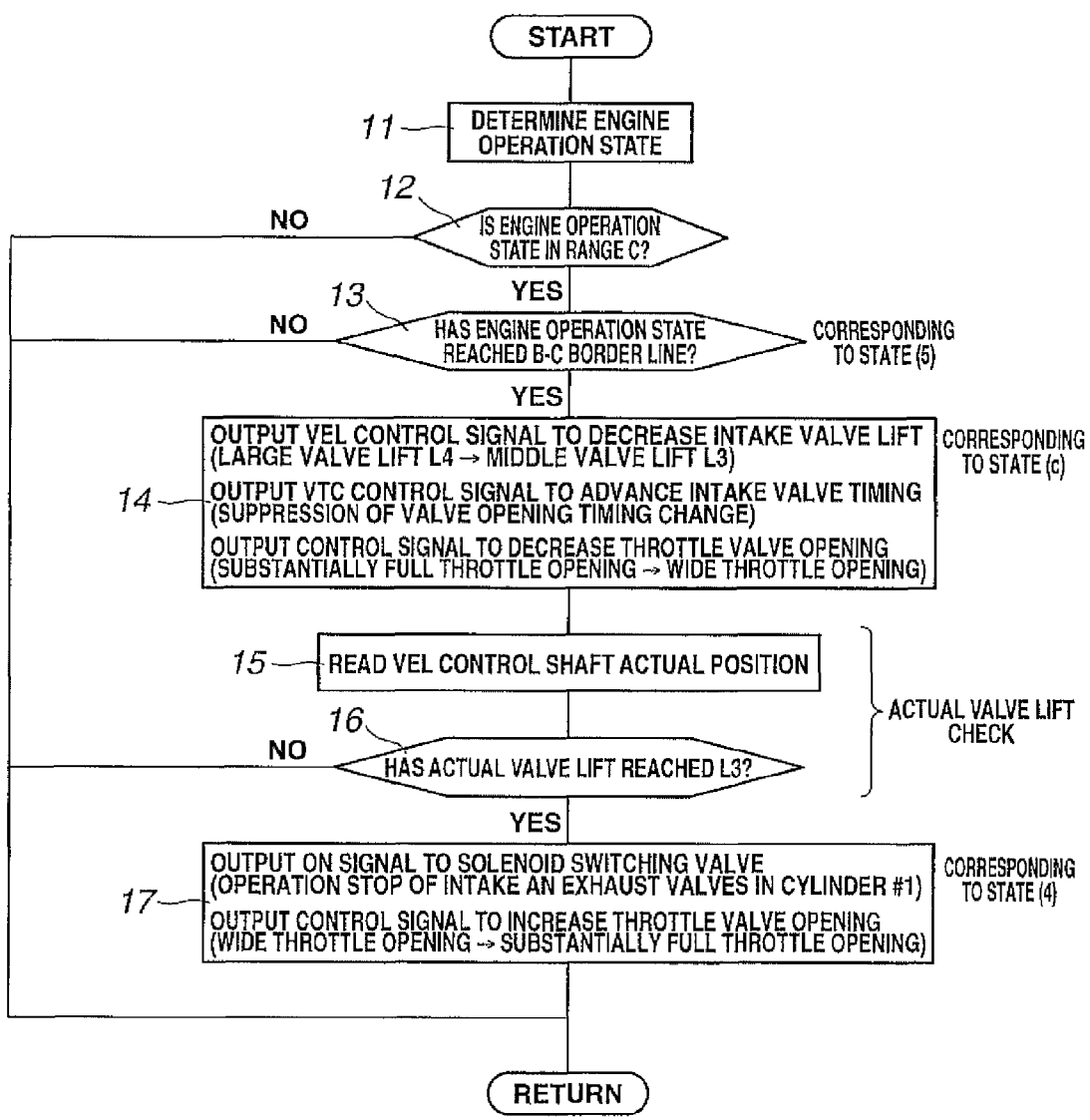
FIG. 18 is a flowchart of control for the transition from operation state (4) to operation state (5) of FIG. 12.

FIG. 18 shows a flowchart of control for the transition from the operation state (5) to the operation state (4).

At step 11, the current engine operation state (operation conditions) is determined by detecting the engine rotation speed, the engine load, the opening of the throttle valve SV and the like based on the inputs from various sensors such as crank angle sensor.

At step 12, it is judged whether the current engine operation state is in the operation range C of FIG. 12. The control returns when the current engine operation state is judged as not being in the operation range C. When the current engine operation state is judged as being in the operation range C, the control proceeds to step 13.

At step 13, it is judged whether the engine operation state has reached the B-C border line BC of FIG. 12. The control returns when the engine operation state is judged as not having reached the B-C border line BC. When the engine operation state is judged as having reached the B-C border line BC, the control proceeds to step 14.

At step 14, the control signals are outputted to decrease the valve lift of the intake valve from L4 to L3 by the intake VEL system, set the valve timing of the intake valve to the advanced side by the intake VTC system (for suppression of opening timing change) and decrease the opening of the throttle valve SV (from substantially full throttle opening to wide throttle opening) for suppression of torque change.

At step 15, the actual rotational position of the control shaft 22 is read. Then, it is judged whether the actual valve lift of the intake valve has reached L3 based on the read data at step 16. The control returns when the actual intake valve lift is judged as not having reached L3. When the actual intake valve lift is judged as having reached L3, the control proceeds to step 17.

At step 17, the ON signal is outputted to the solenoid switching valve 55 to stop the intake and exhaust valves 3a, 3a, 61a, 61a in the cylinder #1. The control signal is also outputted to increase the opening of the throttle valve SV (from relatively wide throttle opening to substantially full throttle opening) for suppression of torque change. With this, the control process exits.

What is important in the above control process is that the intake valve shifts to the valve stop state after checking by the actual lift check part of steps 15 and 16 that the actual valve lift of the intake valve has reached L3. By such control, the shifting of the intake valve to the valve stop state from the state where the valve lift of the intake valve is larger than L3 (i.e. α is larger than α3) can be assuredly prevented to ensure smooth lost motion operation.

The solid arrow from (6) to (7) of FIG. 12 indicates engine acceleration where the engine increases in rotation speed by accelerator pedal depression from the state (6) near the maximum torque and reaches the maximum output state (7) in the vicinity of the engine rotation limit. Each of the valve lift characteristics in these operation states (6) and (7) is shown in FIG. 13. In the operation state (6), the closing timing of the intake valve is retarded to a point after but close to the piston bottom dead center. Namely, the closing timing of the intake valve is set to a valve timing that can achieve the maximum torque at engine middle speed rotation.

With increase in engine rotation speed, the closing timing of the intake valve 3a, 3b is gradually retarded so as to trace the timing of the maximum torque. As the maximum valve lift of the intake valve is set to a large level L4 in the present invention, maximum engine output can be increased with increase in maximum torque at high-rotation engine operation as shown in the operation state (7).

It is thus possible in the present embodiment to increase specific output per engine displacement and improve displacement for improvement of fuel efficiency.

In the present embodiment, the VEL system is provided on the intake valve side to, while ensuring smooth lost motion operation in the valve stop state, set the maximum valve lift of the intake valve larger than the valve lift of the exhaust valve and set the minimum valve lift of the intake valve smaller than the valve lift of the exhaust valve. As mentioned above, the maximum valve lift control enables increase of engine output, improvement of fuel efficiency in the cylinder cut-off operation state (operation state A), widening of the fuel-efficient cylinder cut-off operation range and reduction of engine rotation variation and vibration in the cylinder cut-off operation range; and the minimum valve lift control enables improvement of fuel efficiency in the low-rotation low-load full cylinder operation range (operation range A). Alternatively, a VEL system may be provided on the exhaust valve side.

In the case where the VEL system is provided on the exhaust valve side, it is possible to improve various engine characteristics by increasing the maximum valve lift of the exhaust valve and decreasing the minimum valve lift of the exhaust valve while limiting the amount of lost motion caused by the lost motion mechanism 11 and ensuring smooth lost motion operation of the lost motion mechanism 11. As a result, maximum engine output can be increased by increase of exhaust efficiency at high-rotation operation in high exhaust resistance engine such as turbo engine relatively high in exhaust pressure, engine having an exhaust system equipped with a particulate filter or the like.

Moreover, it is feasible to, while stopping the operations of one of two intake valves and one of two exhaust valves in a partial load operation range, set the valve lift of the exhaust valve in operation smaller than that of the intake valve in operation. In this case, not only fuel efficiency but also exhaust emission performance can be improved by improvement of combustion with intake swirl in one intake valve operation and by development of high flow swirl in one exhaust valve operation and small valve lift control.

Although the present embodiment is adapted for use in the two-cylinder internal combustion engine, the present invention can be easily applied to a four-cylinder in-line internal combustion engine. In the case where the valve stop state is achieved (i.e., the valve lift is set to zero lift) by largely changing the rotational position of the control cam 21 (control cams 22) by the VEL system, two separate control shafts are required for valve stop and cylinder deactivation in part of the cylinders. This results in complication of device structure. It is possible in the present invention to easily achieve valve stop and cylinder deactivation in part of the cylinders just by providing lost motion mechanisms in specific cylinders or parts.

In the case where the minimum valve lift is set to zero lift by the VEL system, the maximum valve lift inevitably decreases to cause deterioration of engine output. Further, there occurs no deterioration of transient engine performance due to small valve lift curve in the middle stage of transition as the valve lift is continuously decreased to zero lift. In the present invention, by contrast, it is possible to increase engine output by sufficient increase of the maximum valve lift and prevent deterioration of transient engine performance caused during continuous decrease of the valve lift to zero lift as mentioned above.

Although torque correction is performed by transient opening control of the throttle valve SV as shown in FIGS. 14, 16 and 17 for stabilization of transient torque in the present embodiment, torque correction may alternatively be performed by ignition timing control so as to attain high response and increase correction responsiveness.

In the present embodiment, the lost motion mechanism 11 is provided on the lash adjuster, which serves as the pivot point of the swing arm, so as to allow direct sliding of the body of the lash adjuster in the cylinder head 1. It is alternatively feasible to arrange an iron casing member between the body of the lash adjuster and the cylinder head 1 by fixing the iron casing member to the cylinder head 1. The problem of sliding wear can be avoided by the iron casing member even in the case where the cylinder head 1 is made of aluminum.

The lost motion mechanism 11 may alternatively be provided on the swing arm by, for example, mounting a roller element displaceably (capable of lost motion) on the main swing arm so as to switch connection and disconnection between the roller element and the main swing arm as disclosed in Japanese Translation of International Application Publication No. 2009-503345. In this configuration, there may occur disengagement or interference between the roller element and the main swing arm or bottom hitting of the lost motion element by excessive lost motion operation. However, the VEL system can be used as in the present invention so as to set the valve lift to a large level and, at the time of shifting to the valve stop state, decrease the valve after decreasing the valve lift to a small level by the VEL system such that it is possible to prevent forcible attitude and achieve smooth lost motion operation by suppression of lost motion amount.

The present invention can be applied to various configurations without departing from the scope of the present invention. For example, it is feasible to apply the present invention to a lifter-type variable valve device with no hydraulic lash adjusters as disclosed in Japanese Laid-Open Patent Publication No. 2010-270633 by accommodating lost motion mechanisms in lifters as disclosed in Japanese Laid-Open Patent Publication No. 63-16112. Even in this case, the VEL system can be used so as to set the valve lift to a large level and, at the time of shifting to the valve stop state, decrease the valve after decreasing the valve lift to a small level by the VEL system such that it is possible to prevent forcible attitude and achieve smooth lost motion operation by suppression of lost motion amount.

There can be adopted in-cylinder direct injection as the fuel injection technique. As fuel is injected from the downstream side of the intake valve, rather than from the upstream side of the intake valve, by in-cylinder direct injection, it is possible to prevent accumulation of fuel on the head part of the intake valve in the valve stop state and shifting to the valve stop/cylinder deactivation state from the state where air-fuel mixture flows in the cylinder from the valve upstream side and thereby allow protection the intake valve head part and cylinder inside wall from contamination by fuel and reduction of change in transient air-fuel ratio at the shift to full cylinder operation.

DESCRIPTION OF REFERENCE NUMERALS

1: Cylinder head
1a: Retaining hole
3a, 3a: First, second intake valve on cylinder #1
3b, 3b: First, second intake valve on cylinder #2
5: Drive shaft
5a: Drive cam
6: Intake-side swing arm
6a: One end portion
6b: Other end portion
7: Swing cam
8: Transmission mechanism
9: Control mechanism
10a, 10a: Intake-side first, second hydraulic lash adjuster (pivot member) on cylinder #1
10b, 10b: Intake-side, third, fourth hydraulic lash adjuster (pivot member) on cylinder #2
11: Lost motion mechanism (valve stop mechanism)
12: Intake-side valve spring
13: Bearing part
14: Roller
24: Body
27: Plunger
27b: Top end portion
34: Sliding hole
35: Lost motion spring (biasing member)
36: Restriction unit
38: Movement hole
39: Restriction hole
40: Retainer
41: Restriction pin
42: Return spring
43: Oil passage
44: Drain passage
54: Oil pump
55: Solenoid switching valve
61a, 61a: First, second exhaust valve on cylinder #1
61b, 61b: First, second exhaust valve on cylinder #2
62: Exhaust-side valve spring

63: Exhaust cam shaft
63a: Rotation cam
64: Exhaust-side swing arm
65a, 65a: Exhaust-side first, second hydraulic lash adjuster (pivot member) on cylinder #1
65b, 65b: Exhaust-side third, fourth hydraulic lash adjuster (pivot member) on cylinder #2

The invention claimed is:

1. A variable valve device for an internal combustion engine, comprising:
   intake and exhaust valves biased in respective valve close directions by spring forces of valve springs;
   a pair of intake- and exhaust-side swing arms that pivot to open and close the intake and exhaust valves, respectively;
   a pair of pivot members that serve as pivot points of the swing arms;
   a variable valve system that continuously varies a valve lift characteristic of the intake valve;
   a valve drive system that causes the exhaust-side swing arm to drive the exhaust valve at a constant valve lift; and
   lost motion mechanisms that stop opening and closing of the intake and exhaust valves by lost motion of the pivot members,
   wherein a maximum valve lift of the intake valve is set larger than the constant valve lift of the exhaust valve; and
   wherein a minimum valve lift of the intake valve is set smaller than the constant valve lift of the exhaust valve.

2. The variable valve device for the internal combustion engine according to claim 1, wherein the lost motion mechanisms have retaining holes in which the pivot members are movably retained and biasing members that bias the pivot members toward the swing arms; and
   wherein the variable valve device further comprises a switching member that switches between a state in which the pivot members are fixed relative to the retaining holes and a state in which the pivot members are movable in the retaining holes.

3. The variable valve device for the internal combustion engine according to claim 2, wherein the pivot members have respective lash adjusters.

4. The variable valve device for the internal combustion engine according to claim 2, wherein the pivot points of the swing arms include semi-spherical concave parts formed in end portions of the swing arms and convex parts formed on the pivot members and engaged in the concave parts, respectively.

5. The variable valve device for the internal combustion engine according to claim 1, wherein the variable valve system has:
   a drive cam to which rotational force of a crankshaft is transmitted;
   a transmission mechanism that converts rotation of the drive cam to pivotal force and transmits the pivotal force;
   a swing cam that pivots by the pivotal force from the transmission mechanism and causes the intake-side swing arm to pivot up and down; and
   a control mechanism that changes an attitude of the transmission mechanism and thereby varies the valve lift characteristic of the intake valve.

6. The variable valve device for the internal combustion engine according to claim 5, wherein the valve drive system has a rotation cam that rotates in synchronism with the crankshaft and causes the exhaust-side swing arm to pivot up and down.

7. The variable valve device for the internal combustion engine according to claim 6, wherein the variable valve system has a phase control mechanism that controls a rotational phase of the drive cam relative to the crankshaft.

8. The variable valve device for the internal combustion engine according to claim 6, wherein the internal combustion engine has a plurality of cylinders arranged in a line; and
   wherein the lost motion mechanisms are provided on sides of the intake and exhaust valves in at least one of the cylinders.

9. The variable valve device for the internal combustion engine according to claim 1, wherein the internal combustion engine has a plurality of cylinders and switches between full cylinder operation that allows the opening and closing of the intake and exhaust valves in all of the cylinders and cylinder cut-off operation that stops the opening and closing of the intake and exhaust valves in a part of the cylinders.

10. The variable valve device for the internal combustion engine according to claim 9, wherein the internal combustion engine has a first full cylinder operation range in which the engine performs full cylinder operation under low-torque or low-rotation conditions including an engine idling state, a second full cylinder operation range in which the engine performs full cylinder operation under high-torque or high-rotation conditions including a high-rotation engine operation state and a cylinder cut-off operation range in which the engine performs cylinder cut-off operation under conditions higher in engine torque or rotation speed than in the first full cylinder operation range and lower in engine torque or rotation speed than in the second full cylinder operation range.

11. The variable valve device for the internal combustion engine according to claim 10, wherein, in the first full cylinder operation range, the valve lift of the intake valve is set to a small valve lift, and the closing timing of the intake valve is set to an advanced side relative to a piston bottom dead center.

12. The variable valve device for the internal combustion engine according to claim 11, wherein, in the first full cylinder operation range, the valve lift of the intake valve is increased such that the closing timing of the intake valve becomes closer to the piston bottom dead center with increase in engine torque or rotation speed.

13. The variable valve device for the internal combustion engine according to claim 11, wherein, before and after transition from the first full cylinder operation range to the cylinder cut-off operation range, the opening and closing of the intake and exhaust valves in each deactivatable cylinder is stopped, the valve lift of the intake valve in each normally activated cylinder is increased from the small valve lift to a large valve lift, and the closing timing of the intake valve in each normally activated cylinder is changed from a point before the piston bottom dead center to a point after the piston bottom dead center.

14. The variable valve device for the internal combustion engine according to claim 11, wherein transition from the first full cylinder operation range to the cylinder cut-off operation range includes a step in which: the valve lift of the intake valve in each cylinder is increased from the small valve lift to a middle valve lift; and the opening of a throttle valve in each cylinder is decreased, followed by a step in which: the opening and closing of the intake and exhaust valves in each deactivatable cylinder is stopped; and the opening of the throttle valve in each deactivatable cylinder is increased, and then a step in which: the valve lift of the intake valve in each normally activated cylinder is increased to a large valve lift; the closing timing of the intake valve in each normally activated cylinder becomes retarded over the piston bottom dead center; and the opening of the throttle valve in each normally activated cylinder is increased.

15. The variable valve device for the internal combustion engine according to claim 14, wherein, in the cylinder cut-off operation range, the valve lift of the intake valve is decreased such that the closing timing of the intake valve becomes closer to the piston bottom dead center with increase in engine torque or rotation speed.

16. The variable valve device for the internal combustion engine according to claim 11, wherein transition from the cylinder cut-off operation range to the second full cylinder operation range includes a step in which: the opening of the throttle valve is decreased; and the intake and exhaust valves in each deactivatable cylinder are put into operation from a valve stop state, followed by a step in which: the opening of the throttle valve is increased; and the valve lift of the intake valve is increased such that the closing timing of the intake valve becomes farther from the piston top dead center.

17. The variable valve device for the internal combustion engine according to claim 11, wherein transition from the second full cylinder operation range to the cylinder cut-off operation range includes a step in which the valve lift of the intake valve is decreased from a large valve lift to a valve lift smaller than the large valve lift, followed by a step in which the opening and closing of the intake and exhaust valves in each deactivatable cylinder is stopped.

18. A variable valve device for an internal combustion engine, comprising:
  a variable valve system that continuously varies a valve lift characteristic of one of intake and exhaust engine valves;
  a valve drive system that drives the other of the intake and exhaust engine valves at a fixed constant valve lift; and
  lost motion mechanisms provided on sides of the intake and exhaust engine valves, respectively, so as to selectively switch between a state in which the intake and exhaust engine valves are opened and closed and a state the intake and exhaust engine valves are stopped,
  wherein a maximum valve lift of the one of the intake and exhaust engine valves controlled by the variable valve system is set larger than the fixed constant valve lift of the other of the engine valves driven by the valve drive system; and
  wherein a minimum valve lift of the one of the intake and exhaust engine valves controlled by the variable valve system is set smaller than the fixed constant valve lift of the other of the intake and exhaust engine valves driven by the valve drive system.

19. The variable valve device for the internal combustion engine according to claim 18, wherein the variable valve system continuously varies the valve lift characteristic of the exhaust valve;
  wherein the valve drive system drives the intake valve at the fixed constant valve lift;
  wherein the maximum valve lift amount of the exhaust valve controlled by the variable valve system is set larger than the constant valve lift amount of the intake valve driven by the valve drive system; and
  wherein the minimum valve lift amount of the exhaust valve controlled by the variable valve system is set smaller than the constant valve lift amount of the intake valve driven by the valve drive system.

20. A variable valve device for an internal combustion engine, comprising:
  a variable valve system that continuously varies a valve lift characteristic of one of intake and exhaust engine valves;
  a valve drive system that drives the other of the intake and exhaust engine valves at a fixed constant valve lift; and
  lost motion mechanisms provided on sides of the intake and exhaust engine valves, respectively, so as to selectively switch between a state in which the intake and exhaust engine valves are opened and closed and a state the intake and exhaust engine valves are stopped,
  wherein a maximum valve lift of the one of the intake and exhaust engine valves controlled by the variable valve system is set larger than the fixed constant valve lift of the other of the intake and exhaust engine valves driven by the valve drive system; and
  wherein a minimum valve lift of the one of the intake and exhaust engine valves controlled by the variable valve system is set smaller than the fixed constant valve lift of the other of the intake and exhaust engine valves driven by the valve drive system.

* * * * *